United States Patent [19]

Durana et al.

[11] Patent Number: 6,018,765
[45] Date of Patent: Jan. 25, 2000

[54] MULTI-CHANNEL MULTIMEDIA DATA SERVER

[75] Inventors: Stephen C. Durana, San Juan Capistrano; Trevor Coolidge, Lakeside; James R. Lizzio, Santa Ana, all of Calif.

[73] Assignee: Storage Concepts, Inc., Irvine, Calif.

[21] Appl. No.: 08/788,066

[22] Filed: Jan. 23, 1997

Related U.S. Application Data

[60] Provisional application No. 60/010,452, Jan. 23, 1996.

[51] Int. Cl.⁷ .................................................. H04N 7/16
[52] U.S. Cl. .............................................. 709/217; 348/7
[58] Field of Search .................... 348/6, 7, 8, 9, 348/10, 12, 13; 455/3.1, 5.1; 395/200.47, 200.48, 200.49; H04N 7/16

[56] References Cited

U.S. PATENT DOCUMENTS

| | | |
|---|---|---|
| 5,027,400 | 6/1991 | Baji et al. . |
| 5,371,532 | 12/1994 | Gelman et al. ............................. 348/7 |
| 5,421,031 | 5/1995 | De Bey . |
| 5,440,336 | 8/1995 | Buhro et al. . |
| 5,477,263 | 12/1995 | O'Callaghan et al. . |
| 5,486,864 | 1/1996 | Zdepski . |
| 5,508,732 | 4/1996 | Bottomley et al. . |
| 5,517,250 | 5/1996 | Hoogenboom et al. . |
| 5,519,435 | 5/1996 | Anderson . |
| 5,533,021 | 7/1996 | Branstad et al. . |
| 5,539,660 | 7/1996 | Blair et al. . |
| 5,543,861 | 8/1996 | Harradine et al. . |
| 5,543,951 | 8/1996 | Moehrmann . |
| 5,544,161 | 8/1996 | Bigham et al. . |
| 5,544,327 | 8/1996 | Dan et al. . |
| 5,553,221 | 9/1996 | Reimer et al. . |
| 5,561,791 | 10/1996 | Mendelson et al. . |
| 5,592,612 | 1/1997 | Birk ......................................... 348/7 X |
| 5,631,693 | 5/1997 | Wundeerlich et al. ..................... 348/7 |
| 5,818,512 | 10/1998 | Fuller ......................................... 348/8 |

OTHER PUBLICATIONS

Timing and Synchronization Using MPEG–2 Transport Streams, SMPTE Journal, Jul. 1996, pp. 395–400.

*Primary Examiner*—Nathan Flynn
*Attorney, Agent, or Firm*—Knobbe, Martens, Olson & Bear, LLP

[57] ABSTRACT

A data server implements a video-on-demand system by providing multiple channels of video and audio on which video programs can play simultaneously and independently. The data server has mass storage containing video programs in the form of compressed digital multimedia data. The data server also has one or more multi-channel decoders which transfer data from mass storage, decompress the data and encode the data into standard video and stereo audio outputs. The data server also utilizes a host which provides video program control commands to the decoders in a manner which emulates a video tape deck.

5 Claims, 16 Drawing Sheets

FIG. 12

| ADDRESS | DESCRIPTION |
|---|---|
| 0x00000000-0x007FFFFF (R/W) | EPROM |
| 0x00800000-0x00800000 (READ ONLY) | CF LEVELS |
| 0x00800000-0x00800000 (WRITE ONLY) | FIFO WRITE |
| 0x00800002-0X00FFFFFF | NOT USED |
| 0x01000000-0x01000XXX | NCR720 CHIP |
| 0x01800000-0x01800007 | CL480 CHANNEL 0. |
| 0x01800008-0x0180000F | CL480 CHANNEL 1. |
| 0x01800010-0x01800017 | CL480 CHANNEL 2. |
| 0x01800018-0x0180001F | CL480 CHANNEL 3. |
| 0x01800020-0x01800027 | CL480 CHANNEL 4. |
| 0x01800028-0x0180002F | CL480 CHANNEL 5. |
| 0x01800030-0x01800037 | CL480 CHANNEL 6. |
| 0x01800038-0x0180003F | CL480 CHANNEL 7. |
| 0x01800040 | 7185 CHANNEL 0. |
| 0x01800042 | 7185 CHANNEL 1. |
| 0x01800044 | 7185 CHANNEL 2. |
| 0x01800046 | 7185 CHANNEL 3. |
| 0x01800048 | 7185 CHANNEL 4. |
| 0x0180004A | 7185 CHANNEL 5. |
| 0x0180004C | 7185 CHANNEL 6. |
| 0x0180004E | 7185 CHANNEL 7. |
| 0x01800050 | FIFO ADDRESS |
| 0x01800052-0x0180006F | NOT USED |
| 0x01800070 | DRAM SIMM-ID |
| 0x01800072-0x01FFFFFE | NOT USED |
| 0x02000000-0x02FFFFFE | DRAM A |
| 0x03000000-0x03FFFFFE | DRAM B |
| 0x04000000-0x04XXXXXX | MICROCONTROLLER MEMORY |

MULTI-CHANNEL MULTIMEDIA DATA SERVER

CROSS-REFERENCE TO RELATED APPLICATION

Pursuant to 35 U.S.C. § 119(e), this application claims the priority benefit of provisional application Ser. No. 60/010,452 filed Jan. 23, 1996.

BACKGROUND OF THE INVENTION

So-called "video-on-demand" systems have become increasingly popular in a number of applications which include distributing pay-per-view movies in hotels, providing interactive information at kiosks in shopping malls, informing and entertaining patients in hospitals, providing in-flight entertainment on major airlines and training at schools and businesses. The available "video server" technology, however, has severely limited the implementation of these and other potential applications for video-on-demand due to the size and cost of the necessary equipment and the minimal end-user controls.

A typical application of video-on-demand is within the hospitality industry where guests are provided with pay-per-view services. The typical systems which provide these services rely upon large banks of analog video cassette records (VCRs) and associated video cassette tapes queued to pre-scheduled times. The drawbacks of these tape-based, analog systems are the need to provide security for the tapes; manual handling and loading of the tapes; extensive system maintenance; and the high cost of operation. In addition, many customers have to wait for the scheduled times to see the movie of their choice. Further, video tapes degrade each time they are played and eventually must be replaced to maintain clarity and quality.

In contrast with video tape systems, hard disk drives provide video retrieval on demand without the picture degradation imposed by the analog video cassette tapes. Current hard disk based video-on-demand systems, however, suffer many of the other limitations of tape-based systems, such as size, cost and high power consumption. These limitations are the outgrowth of large banks of disk drives utilized to store audio and video in a compressed digital format and associated large banks of processing electronics required to decompress and encode this digital audio and video data into standard analog outputs. These disk-based systems are not modular or easily expandable, and, in addition, typically require the removal of these banks of disk drives in order to install new video programming. Thus, current hard disk systems, like tape-based systems are impractical for many video-on-demand applications.

SUMMARY OF THE INVENTION

The present invention is directed to a multimedia server which can simultaneously and independently provide video-on-demand to multiple viewers. A single video program may play with independent start and stop times on each of multiple video outputs simultaneously. Alternatively, each of multiple video outputs may simultaneously play a different video program, independent of the other video outputs. The multimedia server employs a mass storage device for retrieving a selection of video programs stored in a compressed digital format. A host is used to issue commands to decoders specifying which video programs to retrieve from mass storage. The decoders in the multimedia server utilize a microcontroller for host command interpretation, a data controller for transferring compressed data from mass storage and multiple processors, one per video channel, to decompress the video program data and provide standard analog video and stereo audio outputs.

A significant feature of this invention is that it provides prioritized tasks which execute on the decoder microcontroller. Thus, priority is given to currently playing video programs such that playback is continuous and without interruption unless under command of the viewer. Priority is also given to recovery should a video program fail. If time is available after servicing playing and failed programs, a new video program may be started on an unused channel. To accomplish this prioritization, this invention utilizes a dispatch task which periodically interrupts a process loop. In this manner, the dispatch task, which controls the transfer of compressed data from buffer memory to the multimedia processors which decompress data for currently playing video programs, is given the highest priority of all tasks. The process loop also contains prioritized tasks. An input task which controls the transfer of compressed data from mass storage to buffer memory for currently playing video programs is given the highest priority excluding the interrupt-driven dispatch task.

Another significant advantage of this invention is that it provides a decoder which has a memory buffer for matching the comparatively high data transfer rate from a hard disk drive to the comparatively low data output rate of each video channel. The decoder microcontroller meters fixed-length data bursts to each video channel at regular intervals. This combination of rate-matching buffer and periodic fixed-length data bursts to the video channel processors allows the decoder to have a number of video channels limited only by the maximum continuous data transfer rate of the disk drive.

Other important aspects of this invention are described in detail below and include serial data control of the decoder in a manner which emulates video tape deck control and implementation of an eight video channel decoder within a standard VME 1U height 19" chassis.

BRIEF DESCRIPTION OF THE DRAWINGS

FIG. 12 is a preferred memory map for the decoder microcontroller;

DESCRIPTION OF THE PREFERRED EMBODIMENTS

1. Multimedia Server Description

Figure 1:
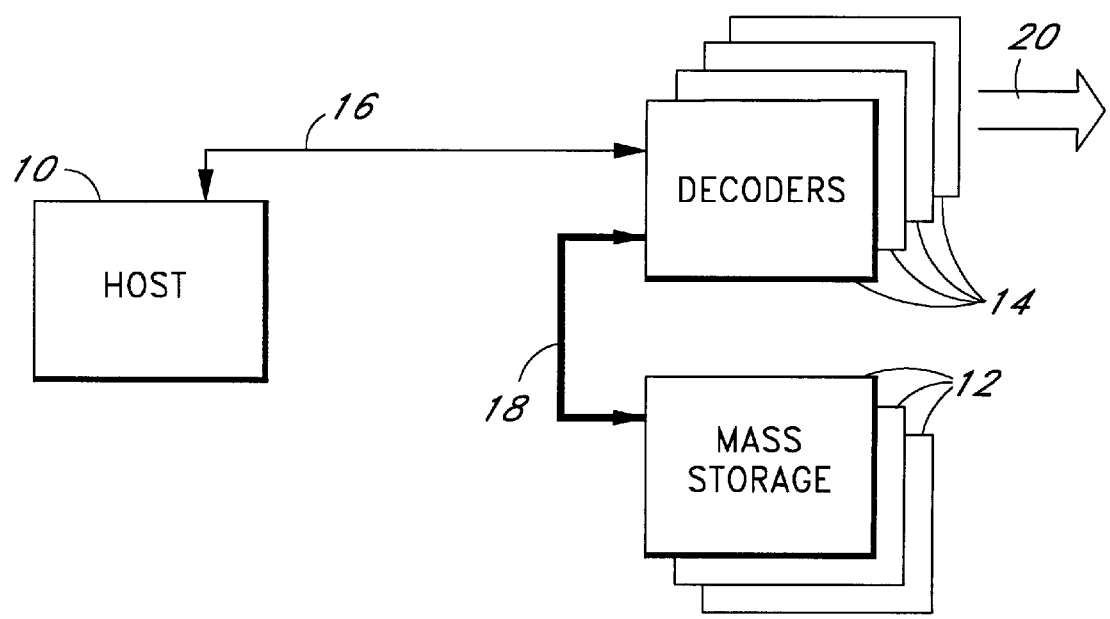
FIG. 1 is a block diagram of a multimedia server according to the present invention.

A multimedia server in accordance with the present invention is shown in FIG. 1. The multimedia server has three basic system components, a host 10, mass storage 12, and a decoder 14. The host 10 provides commands over a command path 16 to the decoder 14 to control the selection and performance of one or more video programs from mass storage 12. The host 10 may also be used for displaying status and error information which the decoder 14 sends to the host 10 over the command path 16. This information may include the current status of each decoder channel, as well as built-in-test results. The mass storage 12 contains the compressed digital video program data which the multimedia server provides on demand. The decoder 14 transfers this compressed data from mass storage 12 over a data path 18 to the decoder 14. The decoder 14 then decompresses this data and produces analog audio and video outputs 20 which allow a viewer to observe and listen to a video program on a standard video display. The host 10 may also be interfaced to the data path 18 to allow compressed video information to be uploaded from the host 10 to mass storage 12, as described below.

The multimedia server shown in FIG. 1 is modular and expandable. Multiple mass storage devices 12 can be interconnected to increase the capacity to store video information. Further, multiple decoders 14 can be interconnected to increase the number of independent video programs which can be simultaneously displayed to multiple viewers. For example, a single hard disk drive in mass storage 12 can support simultaneous viewing of up to 40 movies, each having different start and ending times. Thus, the multimedia server according to the present invention is intended to be expandable from small single-user systems to large multi-user network applications supporting hundreds of end-users and distributing large amounts of multimedia programming.

2. Multimedia Server Applications

Figure 2:
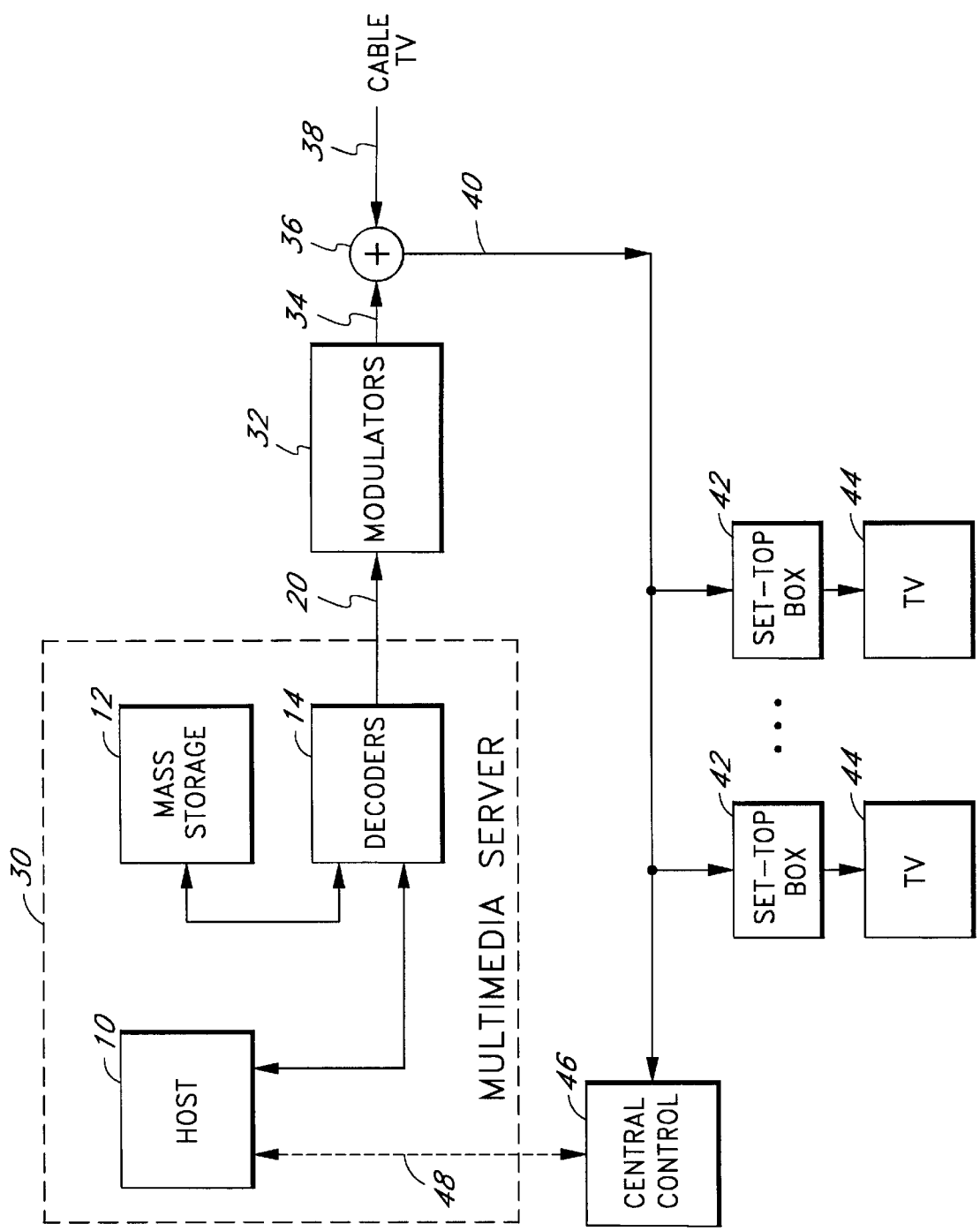
FIG. 2 is a block diagram illustrating the application of an embodiment of the present invention to the hospitality industry.

The above-described multimedia server is typically used in conjunction with known systems for distributing standard broadcast video signals. FIG. 2 illustrates an example use of the multimedia server 30 within the hospitality industry. The outputs 20 of the decoders are first fed to a bank of modulators 32, which create modulated outputs 34 each located at a different frequencies. In this manner, the audio and video outputs 20 of a particular decoder video channel correspond to a particular modulated output 34 at a unique frequency. These modulated outputs 34 are combined with an available cable television signal 38 using passive combiners 36. Modulation and combining of analog audio and video output signals is well-known in the art. This combination places the video and audio outputs of each decoder channel on a separate unused cable television channel.

The resulting combined cable television programming and multimedia server programming is distributed by cable 40 to a "set-top box" 42 and standard television receiver 44 located in each guest room. The set-top boxes 42 are also connected by the cable 40 to a central control 46. When a guest selects a movie, for example by pressing a preselected button on a box or on a box's remote control device, these inputs are sent from the set-top box 42 to the central control 46. In response, the central control 46 commands a specific set-top box 42 to tune to a specific television channel corresponding to a specific decoder video channel. Cable television control via these set-top boxes 42 and a central control 46 is well known in the art. The central control 46 communicates to the multimedia server host 10 over a communications link 48. The host 10 then commands a decoder 14, in a manner described below, to read the selected movie from mass storage 12 and play that movie on the specified decoder video channel.

One of ordinary skill will recognize other ways of distributing the decoder video and audio outputs to various viewers. For example, unmodulated decoder outputs may be connected to video display located in proximity to the multimedia server. This connection may be direct or through distribution amplifiers. As another example, the modulator outputs 34 may be broadcast individually or in combination instead of combined with cable television.

3. Uploading Compressed Data Files

Figure 3:
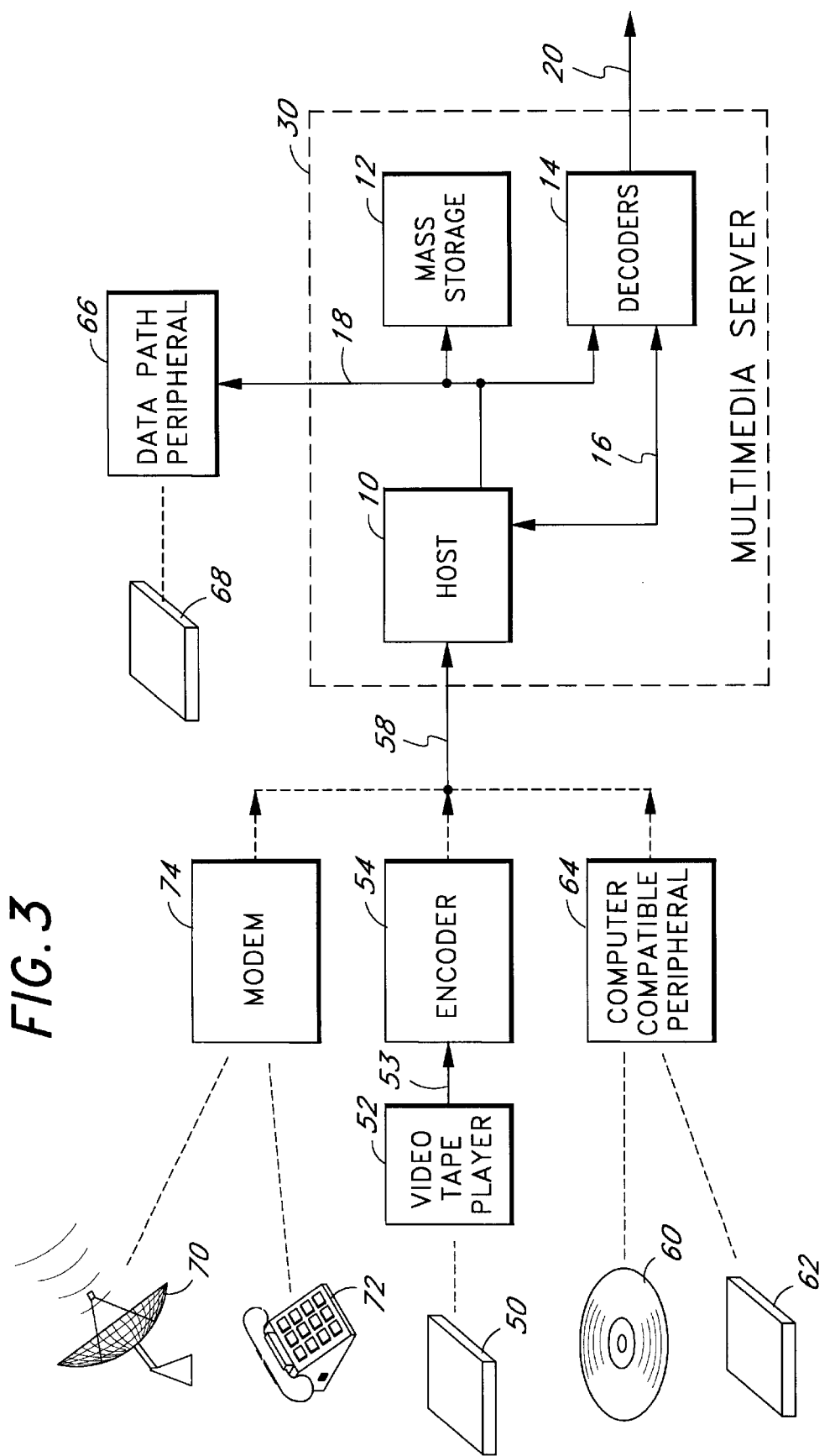
FIG. 3 is a block diagram illustrating various ways to import compressed video program files into the multimedia server.

FIG. 3 illustrates some of the various ways in which video programs are imported into the multimedia server 30 described above. In one scenario, a video program, such as a motion picture, is obtained from a studio in the form of a video tape 50. The video tape 50 is loaded into a video tape player 52. The output 53 of the video tape player is fed into an encoder 54 which compresses the video program. The encoder 54 then transfers this compressed digital data to the host 10 via a data link 58. In this scenario, the host is connected to the multimedia server data path 18, which allows the host to upload the compressed digital data to mass storage 12. In this manner, the video program information contained on the video tape 50 is transferred to, and stored on, mass storage 12 as compressed digital data.

The video tape 50 typically would be a standard ½" digital video tape, of which there are several types, for example Beta SP. The video tape player 52 would be a corresponding digital video tape recorder/player which outputs 53 raw digital data. One of ordinary skill will recognize that the encoder 54 may be any of a variety of available devices which compress raw video program data and provide compressed data files which can be transferred to the host 10 over the data link 58. Alternatively, the video tape 50 may be an analog video cassette tape and the video tape player 52 a conventional analog video cassette recorder (VCR). In that case, the output 53 is analog and an analog-to-digital conversion (ADC) must be performed before the video program is compressed. This ADC could be incorporated within the encoder 54 or be external front-end to the encoder 54. Regardless, the encoder 54 provides a compressed digital data file to the host 10.

The data link 58 can be any of a variety of ways of transferring digital data files. For example, the data link 58 may be a direct connection to the host via a local area network (LAN) such as Ethernet. The data link 58 also may be an indirect transfer via standard removable disks containing digital data files, such as floppy disks or removable hard disks such as those for the Iomega Zip or Jaz drives. One of ordinary skill will recognize many ways in which compressed digital data files are transferred from the encoder 54 to the host 10.

As shown in FIG. 3, an alternative to the above-described scenario, where video programs are supplied in an uncompressed digital or analog format, a video program could be provided in a compressed digital format. For example, a motion picture studio may take original masters and encode them at the studio. The studio would then provide a video program as compressed digital data files on a compact disk (CD) 60 or a computer-compatible digital magnetic tape 62. For example, a CD 60 could be supplied in the CD-I (Compact Disk-Interactive) or DVD (Digital Video Disk) formats, or a magnetic tape 62 could be supplied in a format typically used to back-up files on a conventional computer. One of ordinary skill in the art will recognize that any transportable media complying with a known digital data file format can be used as a compressed video program source.

Also shown in FIG. 3, another alternative to uploading video programs to the multimedia server is via a remote source. For example, a conventional telephone line 72 connected to a modem 74 located in proximity to the host 10 can be used to transfer video program data to the multimedia server 30. The source in that case could be, for example, a computer connected to the telephone line with 72 via another modem. Another example of such a remote source would be the Internet. The remote source of video programs could also be interconnected to the multimedia server 30 via radio transmission, such as a satellite communications link 70. One of ordinary skill in the art will recognize that any means of remotely distributing data could be utilized to upload video programs to the multimedia server. For example, a standard cable television distribution network could also be used to distribute video program data. One of ordinary skill will also recognize that remote video program data may be transferred directly to the multimedia server 30 as compressed data files or may be transferred in an uncompressed analog or digital format to a video encoder located in proximity to the multimedia server and then uploaded to the multimedia server as previously described.

As shown in FIG. 3, another alternative for uploading video programs to the multimedia server 30 is to connect a peripheral 66 directly to the multimedia server data path 18 which interconnects to mass storage 12. For example, the data path 18 could be a standard SCSI (Small Computer System Interface) bus. Compressed video program data files could be provided on digital linear tape (DLT) or digital audio tape (DAT) 68. These tapes are read on a tape player which directly connects to the SCSI bus 18 as a SCSI peripheral 66. In this way, data on the tape 68 is directly uploaded to mass storage 12 via the data path 18.

4. Detailed Description Of Multimedia Server Components a. Host

The host 10 depicted in FIG. 1 is any platform that can supply command data for controlling the operation of the multimedia server. Thus, the host can be, for example, a terminal, a modem or a computer. In a preferred embodiment, the host is a PC. For example, the host may be an Intel Pentium-based microcomputer running under a Microsoft Windows 95 or Windows NT operating system. The command data which the host 10 sends to the decoder 14 is a full set of functions which allow a viewer to control the progress of a video program. These functions, described in detail below, include choosing a video program; starting a program; pausing, reversing or fast-forwarding a program; and canceling a program. These functions are independent for each available video channel 20. In a preferred embodiment, the control data is in an ASCII format. This allows the host to communicate with the decoder using any of various protocols, such as those developed for the control of video cassette recorders (VCRs). These protocols would include CTL-S, LANC, VISCA and CTRLJ. In a preferred embodiment, the command path 16, shown in FIG. 1, is a standard RS-232 serial bidirectional communications link which operates at 9600 baud with 8 data bits and no parity.

b. Mass Storage

Mass storage 12, illustrated in FIG. 1, is a device capable of storage and random access of significant amounts of digital data. For example, mass storage may include magnetic media such as conventional hard disks, optical media such as laser disks, or semiconductor media such as random-access-memory with an uninterruptable power supply. In a preferred embodiment, mass storage 12 is a configuration of one or more hard disk drives. This configuration can be a single hard drive, two or more drives, a RAID (Redundant Array of Inexpensive Disks) system, or combinations of the above. The total run time of video programming which can be stored onto these hard drives is based on the drive storage capacity and the compression technology used.

Figure 4:
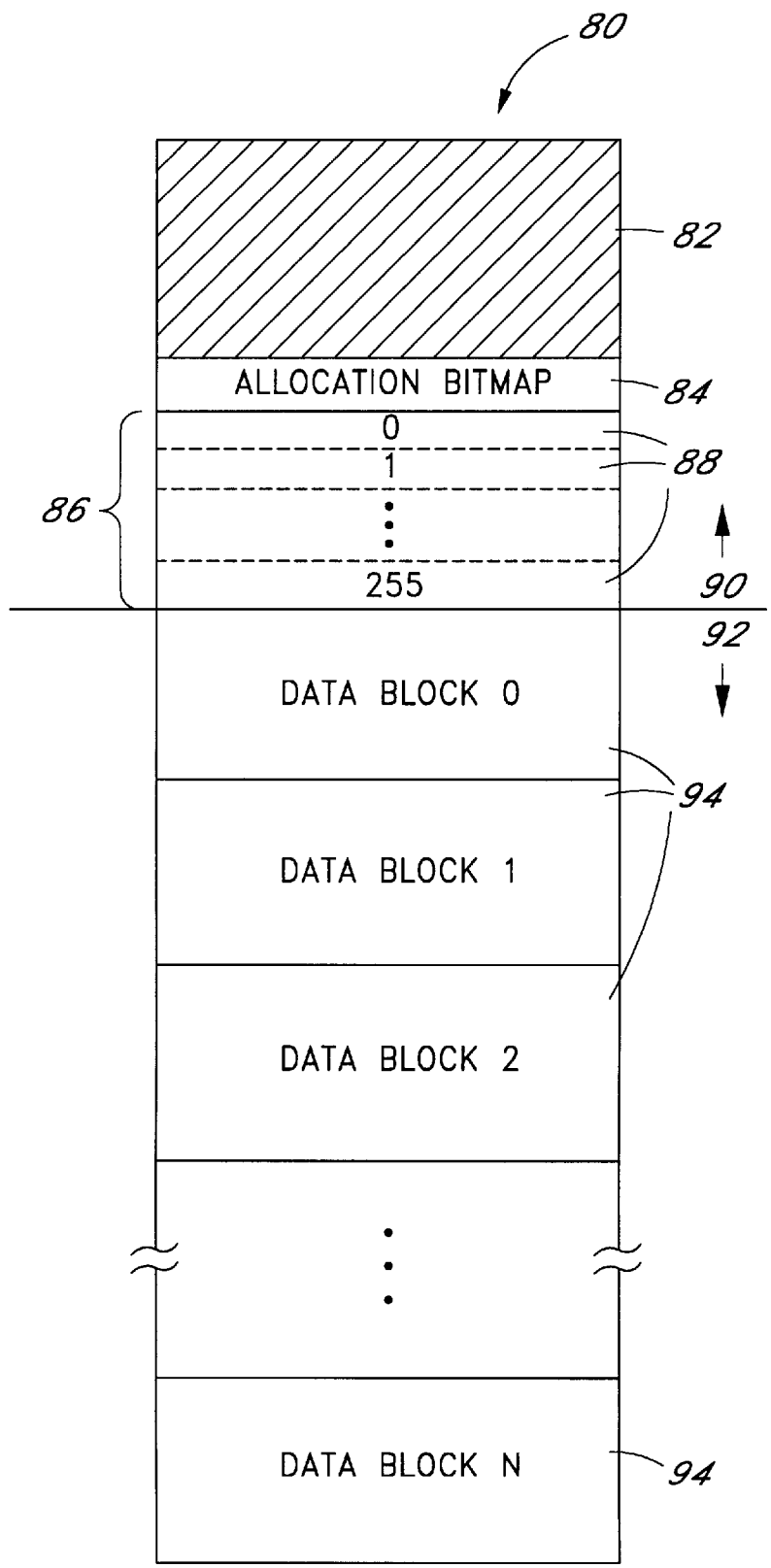
FIG. 4 is a sector map of a preferred file system for mass storage.

Illustrated in FIG. 4, a preferred disk file format advantageously organizes the storage of compressed data so as to thwart copyright violations of the video programs, avoid inadvertent destruction of the data, facilitate data access and provide efficient data storage. To accomplish these objectives, the format of FIG. 4 is noncompliant with any standard file format, such as that used by the Microsoft DOS or Windows operating systems. The first portion of a hard disk storage space 80 is an unused block 82 of 768 ($300_{16}$) sectors. This is that portion of a disk which common operating systems use for volume and partition information. These sectors are not used in order to avoid inadvertent destruction of video data should the disk be accessed by a common operating system.

The next 2 sectors (1 Kbyte) are reserved for an allocation bit map 84. There is a one-to-one correspondence between each bit in this bit map and a specific one of the disk data blocks, which are described below. If a bit is set, the corresponding data block is used. If a bit is not set, the corresponding data block is free. Thus, the allocation bit map 84 facilitates the location of free data blocks when uploading video program data.

The next 512 sectors (256 Kbyte) are reserved for the directory 86. The directory 86 nominally contains 256 directory entries 88 of 2 sectors (1 Kbyte) each. Each one of these directory entries correspond to a specific video program title stored on the disk. Hence, nominally 256 unique video programs can be stored on a particular disk drive. Each directory entry 88 has the following format: movie name; movie rating; # of data blocks used; start address of first data block used; stop address of first data block used; start address of second data block used; stop address of second data block used; . . . start address of last data block used; stop address of last data block used. Blocks are only allocated to a single movie. The last block used by a movie, however, may be only partially filled, resulting in some wasted storage space.

As shown in FIG. 4, the first portion 90 of the disk is of fixed size. The second portion 92 of the disk is of variable size depending on the total size of the hard disk. This second portion 92 is filled with a series of data blocks 94 of roughly 32 Mbyte each. This size data block corresponds to roughly 3 minutes of movie time if data is compressed in the MPEG-1 format, discussed below. A 32 Mbyte data block size is a reasonable tradeoff between numerous small-size blocks which result in too large a directory block and a fewer number of large-size blocks which result in too much wasted storage in partially used blocks. The actual block size is a multiple of 44×512. The 512 number is derived from the sector size in bytes. The 44 number is a result of the number of bytes transferred at a time to the multimedia processors in each decoder, as described below.

c. Data Path

Referring back to FIG. 1, in a preferred embodiment, the data path 18 interconnecting mass storage 12 and the decoder 14 is a SCSI-III interface. One of ordinary skill, however, will recognize that the data path 18 can be any bus technology which allows the interconnection of multiple, individually-addressed, independent devices. The bus technology must also support a data transfer rate which is generally greater than the number of multimedia server channels multiplied by the output data rate for each channel.

d. Decoder

Referring again to FIG. 1, decoders 14 read compressed data from mass storage 12, decompress that data, and produce audio and video outputs 20. Although, each decoder 14 receives video display commands from the host 10, each decoder 14 independently orchestrates the sequence of tasks it requires to retrieve and decompress video programs for simultaneous play on each of its multiple video channels. In a preferred embodiment, a decoder 14 has eight video channels capable of simultaneously and independently playing up to eight video programs. That is, eight separate movies, commercials, or video clips can simultaneously play through the decoder 14; a single movie, commercial or video clip can simultaneously play on each of the eight video channels of the decoder, with the video program having independent start and stop times on each video channel; or any combination of the above. Further, multiple decoders 14 can be co-located and linked together with the data path 18 and control path 16 to provide video channels totalling multiples-of-eight.

A design goal of the present invention was to achieve a decoder implementation which provided as many video channels as possible in a single standard 19" rack. This was an important design consideration because widely separated data processing electronics, modulators and associated RF (radio frequency) components result in increased interconnect cabling and associated increased impedance and capacitance. This leads to signal degradation, cross-talk and other potential problems. Further, widely separated components also leads to power distribution problems, such as voltage drops due to line resistance and ground loops.

To achieve this goal of a large number of video channels in a single rack, a preferred decoder provides eight channels in a "1U" VME rack chassis, with the critical processing electronics mounted on a single "6U by 4HP" VME board contained within that chassis. The VME standard defines both a bus and the form factor for boards which mate with this bus and is commonly used for process control applications. The VME standard defines dimensions in U (units of measure) and HP (horizontal position). For example, a standard "6U by 4HP" board for the VME bus is equivalent to a board dimensioned 234 mn by 160 mm. Thus, all critical processing electronics for a preferred eight-channel decoder are located within a 374.4 cm$^2$ surface area. Also, the "1U" VME rack chassis is approximately 1.54" (height) ×12" (depth)×19" (width) and contains a complete preferred eight-channel decoder, including the VME board described above, power supply, fan and connectors.

Figure 5:
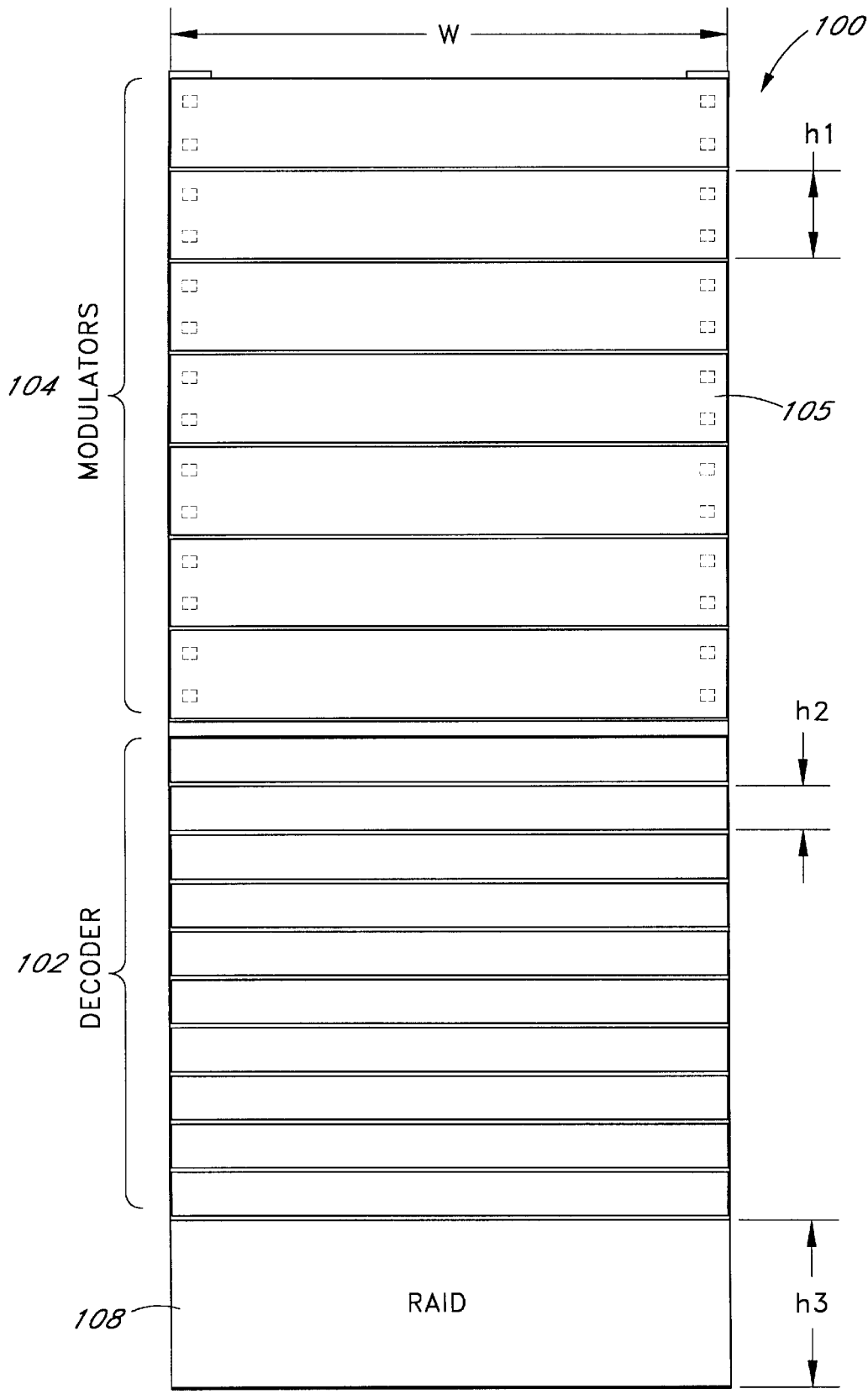
FIG. 5 is a diagram illustrating the layout of multimedia server components in a standard 19" rack.

FIG. 5 illustrates ten decoders 102 implemented in this preferred form factor and mounted in a standard 19" rack 100. Sharing the rack with the decoders 102 is a bank of modulators 104 and a rack mounted RAID 108. A typical modulator chassis 105 is capable of housing twelve modulators, one each for twelve decoder channels. Thus, seven modulator chassis 104 provide the capacity to modulate over eighty-four video channels. Typical approximate dimensions for these rack-mounted multimedia server components are h1=3", h2=1.5", h3=5.25" as shown in FIG. 5. The system illustrated in FIG. 5, when connected to a host, provides a multimedia server with the capacity for processing and displaying eighty independent video channels, sufficient to service the video-on-demand needs of a 1000 room hotel. Multiple such racks may be utilized to implement a multimedia server system with an even greater video channel capacity.

Figure 6:
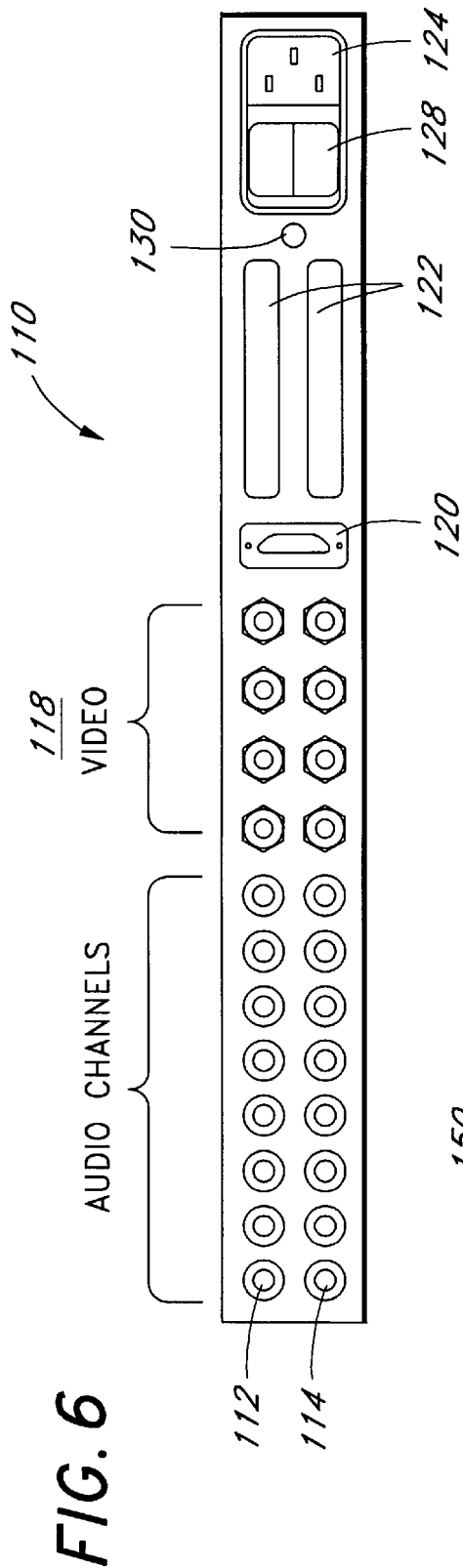
FIG. 6 is a diagram illustrating the back panel chassis layout of the video, audio, data bus and power connectors of a preferred decoder.

FIG. 6 illustrates the connector back panel 110 for this preferred decoder form factor. Shown are a row of eight left audio outputs 112 and a row of eight right audio outputs 114 available on standard RCA connectors. Also shown are two rows of four video outputs 118 available on standard F connectors. The RS-232 serial port provides the bi-directional control path linked to the host on a standard DB-9 connector 120. The input and output connections to the SCSI-III bus are provided on standard 68-pin SCSI connectors 122. A standard AC inlet 124 is provided with an on-off power switch 128. Finally, a reset button 130 is provided to manually reset the decoder.

Figure 7:
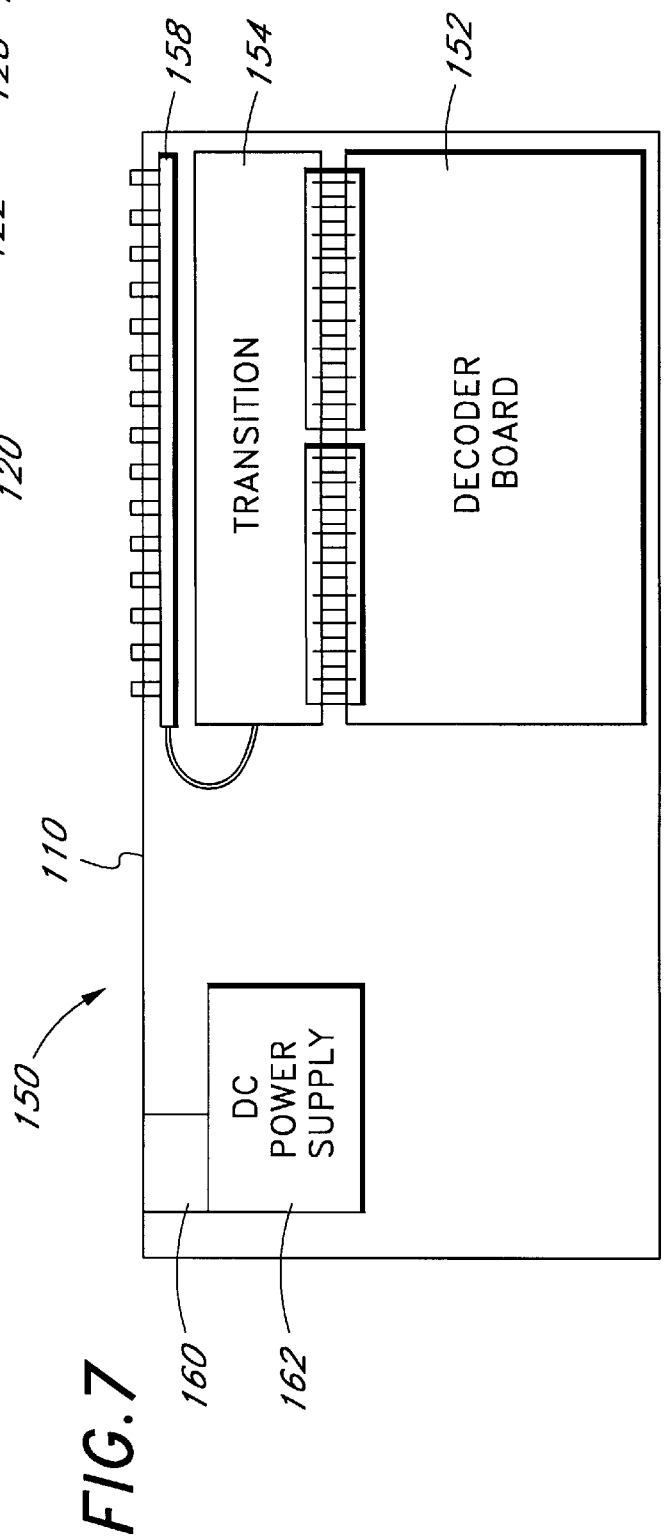
FIG. 7 is a diagram illustrating the internal chassis layout of the decoder board, transition board, DC power supply and video/audio connectors of a preferred decoder.

FIG. 7 illustrates the internal chassis layout for this preferred decoder form factor. The VME decoder board 152 is mounted to a transition board 154, both of which are mounted horizontally in the chassis 150. This arrangement achieves the minimal chassis "1U" rack height. The audio and video back panel connectors are mounted on a connector board 158 which is mounted flush with the back panel 110. A power line filter 160 connects the AC line voltage to a DC power supply 162, which distributes DC power to the transition board 154. The transition board 154 contains DC-to-DC converters, pi-filters for the video outputs and a cabling interface for the back-panel connectors 158. DC-to-DC converters on the transition board 154 derive power from the DC power supply 162 and provide +5 V and +3.3 V for logic devices on the decoder board 152. Other DC-to-DC converters provide power to analog devices on the decoder board 152, maintaining separate power distribution to the analog and digital circuits.

5. Multimedia Server Configurations

Figure 8:
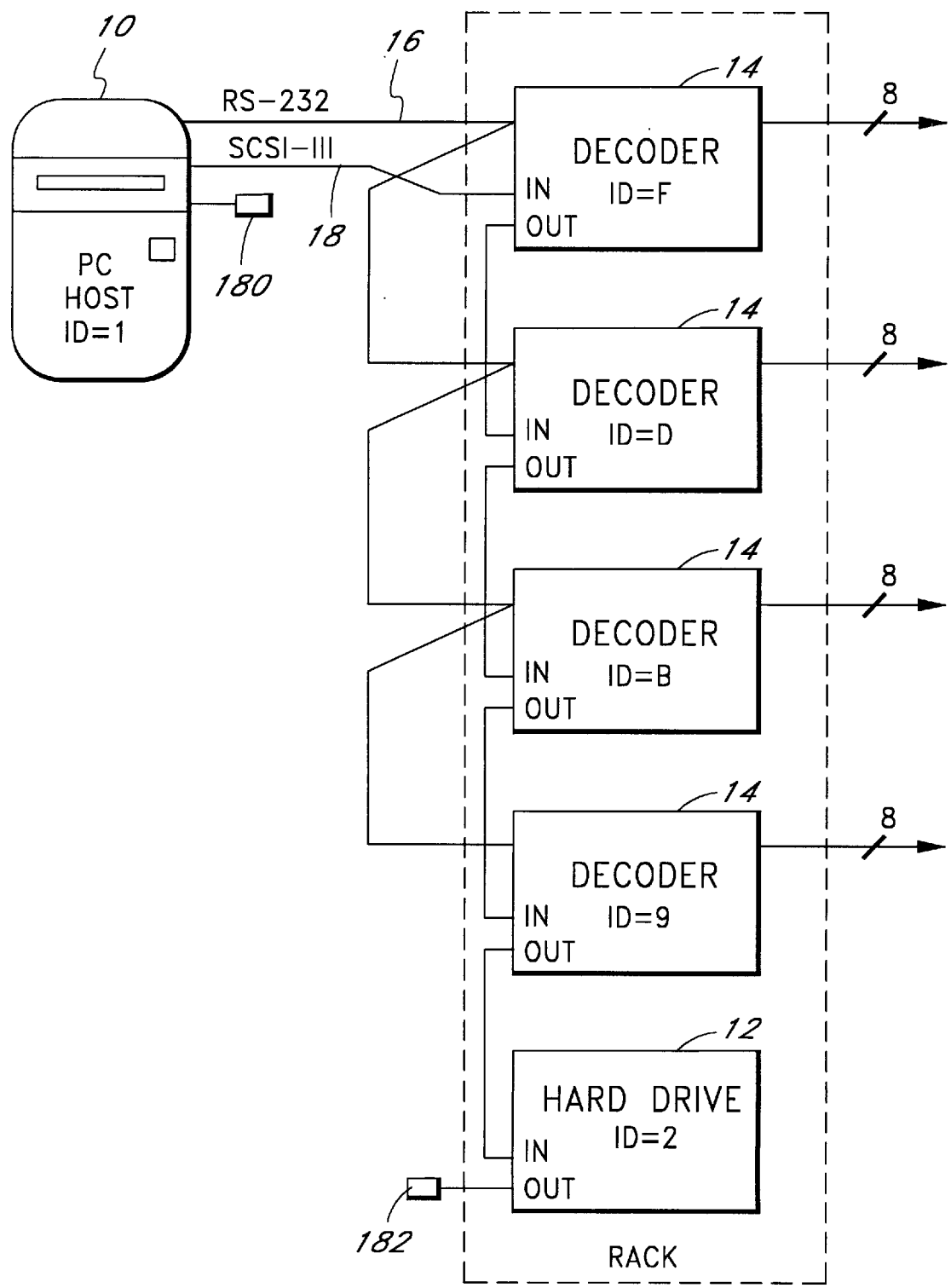
FIG. 8 is a block diagram illustrating the interconnection of a preferred multimedia server configured to fully utilize the data transfer capacity of a current technology hard drive.

FIG. 8 illustrates the interconnection of a preferred embodiment of the multimedia server according to the present invention. A PC host 10, mass storage 12 and four decoders 14 are all interconnected on the data path 18, which is a SCSI-III bus. The SCSI-III bus is connected in a daisy-chain from the host 10 to the hard drive 12 using "IN" and "OUT" connectors on each device. SCSI terminations 180, 182 are located on either end of the SCSI-III bus at the host 10 and the hard drive 12. The PC host 10 and individual decoders 14 are also interconnected on the command path 16 which is an RS-232 link.

The host 10, the mass storage 12 and decoders 14 shown in FIG. 8 each have unique addresses or "IDs." These addresses serve to identify the intended destination of host originating command messages transmitted over the control path 16 to the multiple decoders 14. These addresses also serve as unique identifiers of the data source and data destination of devices on the data path 18. The preferred addressing scheme is the assignment of SCSI address in the range of 0–15 (0-$F_{16}$). These addresses are selectable via rotary switches on each of the decoder boards and disk drives and on the PC's SCSI I/O card. Specific addresses may be assigned at random unless on-line updating is implemented. On-line updating is a feature where video programs are playing while video programs are also being uploaded to mass storage. In that case, the SCSI ID of the host must be less than that of any decoder, because the highest priority on the SCSI bus is given to the device with the largest ID. Otherwise, the host will grab the SCSI bus from a decoder during an update and interfere with a video program in progress.

6. Compressed Data Technology

Various technologies and standards exist for video compression. Examples are JPEG and MPEG. In a preferred embodiment, the decoder processes compressed video information that is compliant with the Motion Picture Experts Group (MPEG) standard. The standard is officially known as ISO/IEC Standard, "Coded Representation of Picture, Audio and Multimedia/Hypermedia Information," ISO 11172-1. It is more commonly referred to as the MPEG-1 standard. This standard addresses the compression, decompression and synchronization of video and audio signals. Much of the information in a picture which is part of a video sequence is redundant to pictures occurring before or after it. The MPEG standard utilizes this redundancy by representing some pictures in terms of differences from reference pictures, in a technique known as inter-picture coding. A coded resolution of 352×240 pixels at a 30 Hz frame rate is typical.

7. Multimedia Server Performance

The hard drive data transfer rate and response time requirements are dependent upon the number of active video channels. With current technology, a single 5¼" hard drive can supply data at a burst rate approaching 20 Mbytes/second and a continuous data transfer rate approaching 6 Mbytes/second or 48 Mbits/second. For data compressed in MPEG-1 format, the output data rate is 1.4 Mbits/second. Thus, a single disk drive can accommodate 32 video channels, which is less than 48 Mbits/second divided by 1.4 Mbits/second. Current 3½" drive technology is capable of accommodating up to 40 channels. Multiple disk drives and RAIDs are capable of transferring data at an even higher average data rate. Thus, when there are more than 40 active video channels, RAID storage is preferred. The preferred decoders according to the present invention are advantageously configured to allow the transfer of MPEG-1 data from a hard disk or RAID at a data rate approaching the disk's or RAID'S maximum continuous data transfer rate.

FIG. 8 illustrates an example configuration of the preferred embodiment of the multimedia server described above. This multimedia server configuration accommodates 32 video channels from a single 5¼" hard disk. Currently, a Seagate 5¼" hard drive is available with a capacity of 9 Gbytes. MPEG-1 video data requires approximately 1 GByte of storage for 90 minutes of video. Thus, a multimedia server configured as in FIG. 8 and utilizing a 9 GByte hard disk drive is capable of supplying 32 different, simultaneously playing video programs from a library of video programs totalling 13.5 hours of playing time. For example, 9 full-length movies, each having a run time of 90 minutes, could be simultaneously and independently playing on these 32 channels.

8. Serial Control Commands

The basic mechanism used by the host to control a decoder is an ASCII protocol. The host sends a decoder a request, prompting a response from the decoder. This request/response transaction is sequential, i.e., there is only one request pending at any given time because the control bus is potentially shared by multiple decoders. Also, the decoder does not transmit any unsolicited messages to the host.

A preferred protocol has the format: <LR><id><command><channel #> [options]<CR>, where LF and CR are the ASCII characters line feed and a carriage return, respectively. "Id" is the unique address for each decoder, which is switch selectable within each decoder. "Command" is an ASCII number character associated with the commands discussed below. "Channel #" is a number assigned an individual video channel. "Options" denotes additional fields used for certain commands. The reply format is <LR><id><status><CR>, where "status" is either the ASCII characters "OK" or "ERR." The ERR response indicates that the command is not valid within the context of the current state of the requested channel.

The PLAY command is used to start a video program. The syntax of the PLAY Command has as options the fields <disk id><movie #>. "Disk id" specifies one of multiple disks. Each disk nominally contains 255 separate video programs which are identified by the numbers 1–255 in the "movie #" field. A PLAY command may only be issued to an idle channel or an ERR response results. At the end of a video program, the decoder will reset and the screen goes black.

The PLAYNORESET command is the same as the PLAY command except that the video program remains on the last frame when it stops. The syntax of this command is the same as for the PLAY command. The CONTINUOUSLOOP command is also the same as the PLAY command except that the video program repeats automatically.

The PAUSE command stops processing of the video and audio streams. The last valid video frame is displayed and the audio stops. The channel must be in the RUN state for a PAUSE command or an ERR response results.

The CONTINUE command resumes processing of the video and audio streams and follows the standard command syntax. Only a paused channel may be continued or an ERR response is received.

The STOP command terminates processing of the video and audio streams. The audio stops and the screen is blanked. A channel must be in a run or paused state to be stopped or an ERR response is returned. Alternatively, the STOP command is valid at any time and it resets a channel.

The SELECTAUDIO command is used to select the audio channels. This command has an extension field <output switch>. Each decoder channel has two audio outputs. This provides for full stereo capability. The normal configuration is therefore a left channel and a right channel. In some applications, tvo independent monaural channels are encoded in the audio stream. For example, a video program may be recorded with two different language tracks. The Select Audio Option "0" sets the audio output to normal, i.e. the left audio channel goes to the left audio phono jack and the right audio channel goes to the right audio channel jack. The Select Audio Option "1" reverses the left and right outputs. In this manner, output switching is accomplished.

The RE-START command is used to re-start the decoder after an event such as a power outage. The status from this command contains sufficient information to restart a video program from the point of failure. The options are the fields <disk id><movie #><position>.

The REPORTSTATUS command is used to poll the status of the decoder. The command syntax does not have a "channel #" field. The decoder module status provides complete status of the specified channel at time of inquiry. This information can be used later to continue a video program in the event of an outage. The status of a single channel is returned for each command. Subsequent commands return the status of other channels in a round robin fashion. The status returned includes the variables Block Location, Restart, Channel Error, Read Error and Boot-up.

The CONFIGURATION command is used to configure SCSI time-outs and check the status of each channel in the decoder. This command is used to configure the decoder time-outs after a "Boot-up" variable is reported by the decoder. If during operation, a decoder responds to REPORT STATUS command with a boot-up variable, then the host issues this command with a decoder time-out is value approximately equal to 2 seconds multiplied by the number of decoders on the SCSI bus. For example, in a two-decoder configuration, the decoder time-out is 4 seconds.

The status variables received in response to a REPORT STATUS command contain various decoder information. The Block Location variable is the absolute disk address which the decoder would normally fetch on the next read cycle. The Restart variable indicates an internal decoder error resulting from corruption of the MPEG data stream. If this condition occurs, the particular decoder will automatically restart the affected decoder chip and resume playing the video program. The Channel Error variable indicates that a fatal error was encountered while a video program was in the process of starting. This condition is fatal and usually results when a disk goes off-line or when the disk index structures have been corrupted. The Read Error variable indicates that a recoverable error was encountered while a video program was playing.

9. Built-In-Test

Each Decoder has Built-In Test (BIT) capabilities. If a critical error occurs, the reply to any of the above Host initiated commands will be of the following form <LF><test mode><error source><CR>. The <test mode> specifies a specific BIT test. the <error source> field is a text message describing the source of any malfunction detected by the BIT. Preferred BIT tests include the read/write testing of decoder RAM; decompressor register testing including read/write testing of decompressor-dedicated DRAM; a color bar test of the video encoders; and a serial port test which displays test data on the host monitor.

10. A Preferred MPEG-1 Decoder a. System Description

Figure 9:
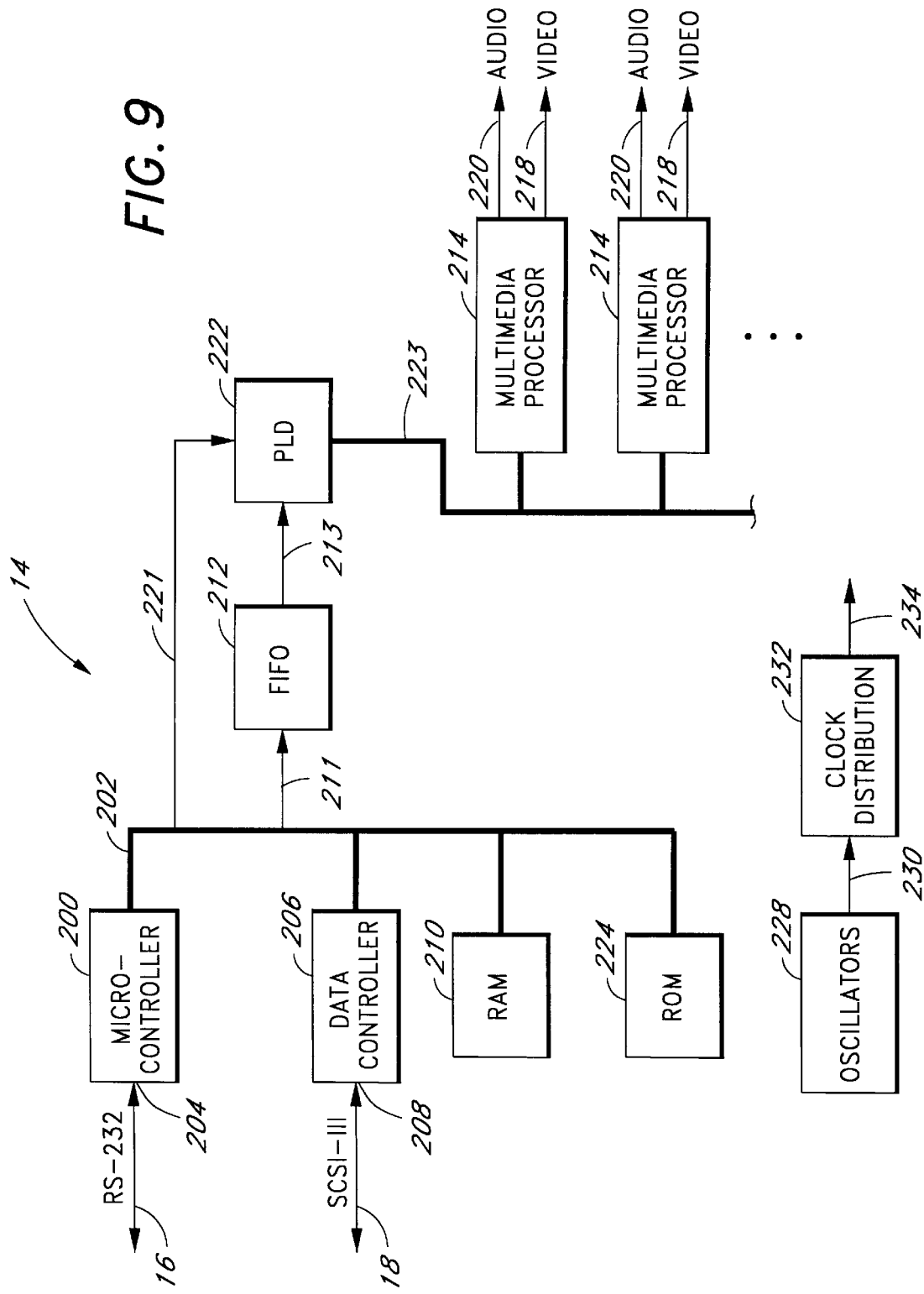
FIG. 9 is an block diagram of the decoder portion of the multimedia server according to the present invention.

Shown in FIG. 9 is a preferred embodiment of the decoder 14 when MPEG-1 data is used. A microcontroller 200 performs the basic control of the decoder operations. The microcontroller 200 provides a system bus 202 having data, address, control and status lines over which various decoder components communicate. The microcontroller 200 also provides an RS-232 control port 204. Referring back to FIG. 1, this control port provides the command path 16 interface to the host 10, which is external to the decoder 14. Again referring to FIG. 9, a data controller 206 located on the system bus 202 provides a SCSI-III data port 208. Referring back to FIG. 1, this data port provides the data path 18 which is interconnected to mass storage 12, which is external to the decoder 14. Again referring to FIG. 9, a random-access-memory (RAM) 210 located on the system bus 202 provides temporary read/write storage to buffer data transferred over the system bus 202 from the data controller 206. A first-in-first-out (FIFO) memory 212 located on the system bus 202 provides a read/write storage to buffer data transferred over the system bus 202 from the RAM 210. The multimedia processors 214 read compressed digital data from the FIFO 212 and convert that data to analog video outputs 218 and stereo audio outputs 220. In this preferred embodiment, there are eight multimedia processors 214 providing eight independent video channels. Each video channel provides a video output 218 and stereo audio outputs 220. These video and audio outputs contribute to the combined video and audio outputs 20 of the decoders 14, as shown in FIG. 1. Referring back to FIG. 9, a programmable logic device (PLD) 222 provides timing and control signals for the decoder 14 as explained in more detail below. A read-only-memory (ROM) 224 provides non-volatile storage of program instructions for the microcontroller 200 in addition to microcode and configuration data utilized by other decoder components. Oscillators 228 provide signals 230 at various frequencies which drive the clock distribution circuitry 232. This clock distribution circuitry 232 provides clock signals 234 of various frequencies which are used to synchronize various decoder components.

b. Microcontroller

In a preferred embodiment, the microcontroller 200, shown in FIG. 9, is a Motorola MC68349 processor. The MC68349 has a system bus 202 incorporating a 32-bit address bus and a 32-bit data bus. The MC68349's internal serial module provides the serial control port 204 via a Maxim Max242 which buffers the RS-232 lines of the control path 16. In this embodiment, the MC68349 is externally clocked at 25 MHz. The MC68349 internal serial module is also provided with an external baud rate clock of 3.68 MHz. These clock signals are derived from the clock distribution circuit described below.

To perform its decoder control functions, the microcontroller 200 executes firmware instructions contained in ROM 224. In a preferred embodiment, certain time-critical of these instructions are downloaded to an internal memory in the microcontroller 200. The functions of the firmware are described in detail below in conjunction with a description of decoder operation.

c. Data Controller

Again referring to FIG. 9, the data controller 206 responds to requests from the microcontroller 200 to transfer data over the SCSI-III data path 18 from mass storage. The data controller 206 reads this data through the data port 208 and into the data controller 206. The data controller 206 then transfers this data over the system bus 202 and into RAM 210. In a preferred embodiment, the data controller is an NCR 53C720SE SCSI I/O Processor. This device has an internal SCSI core which provides a SCSI-III bus interface at the data port 208 and controls data transfers from the SCSI-III bus into an internal SCSI buffer. When the system bus 202 is available, the 53C720SE becomes the bus master and performs a direct-memory-access (DMA) data transfer from an internal DMA buffer to RAM 210. In this manner, the 53C720SE device can support data bursts of 20 MByte/second on the SCSI-III bus 18 and 42.66 MByte/second on the system bus 202.

d. RAM

Illustrated in FIG. 9, the decoder RAM 210 acts as a rate-matching buffer between the high data transfer rate from mass storage to the data controller 206 and the low data processing rate through each multimedia processor video channel 214. For example, in the preferred embodiment discussed above, the SCSI-III bus transfers mass storage data at 20 MBytes/second (160 MBit/second) and the multimedia processors each process MPEG-1 compressed data at 1.4 MBits/second. Thus, the RAM buffer must compensate for more than two orders-of-magnitude difference between the output data rate and the input data rate.

Figure 10:
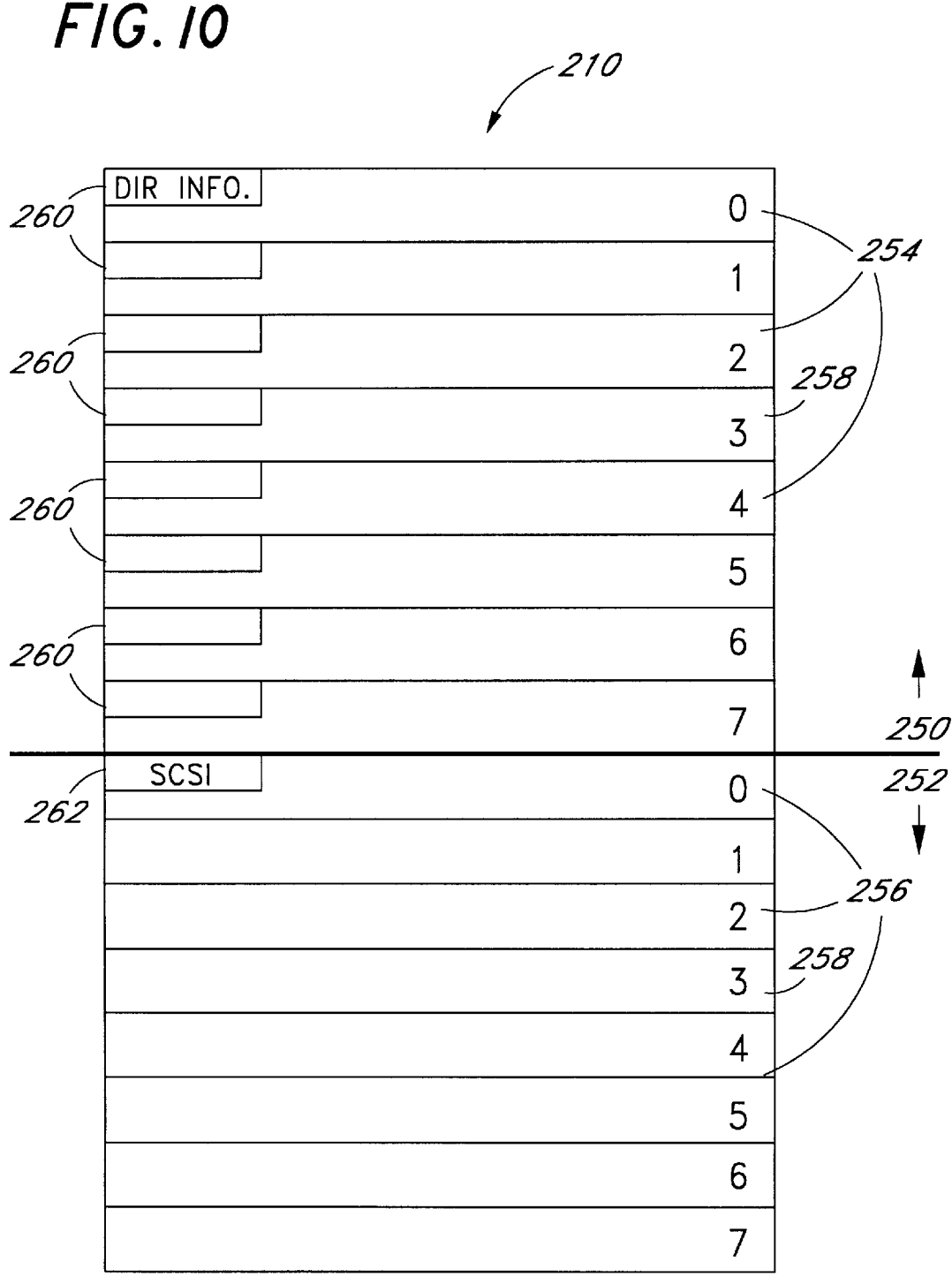
FIG. 10 is a memory map of RAM illustrating ping-pong buffers and allocations for video program directory information and data controller firmware.

In a preferred embodiment, shown in FIG. 10, RAM is logically divided into a first half 250 and a second half 252. Each half is also logically divided into eight individual buffers 254, 256 each corresponding to one of the eight decoder video channels described above. Further, individual buffers from the first half 250 pair with corresponding buffers in the second half 252 to form eight individual buffer pairs 258. Each buffer pair 258 creates a "ping-pong" buffer for each of the eight video channels. That is, as the first buffer 254 of a pair is being loaded by the data controller, the second buffer 256 of a pair is being unloaded by its corresponding multimedia processor. Then the process reverses, with the second buffer 256 being loaded with data while the first buffer 254 is being unloaded. The term "ping-pong" buffer derives from this alternate loading and unloading of each buffer.

FIG. 10 illustrates that a 2 Kbyte portion 260 of each memory partition used for the ping-pong buffers 254 is allocated to contain the directory information for the video program which plays on the corresponding video channel. As described above, this directory information is the movie name, rating, number of blocks used, and the start and stop addresses for each block used. FIG. 10 also illustrates that a portion 262 of one of the ping-pong buffers 256 is allocated to the data controller microcode.

The amount of buffer memory which must be allocated per video channel is a function of the total number of video channels in the multimedia server. This follows because the more video channels, the longer the latency time for mass storage to retrieve data corresponding to any particular channel. Larger buffers are required to compensate for larger latency times to prevent a video channel from running out of data. In a preferred embodiment, RAM size varies from 4 Mbytes to 32 Mbytes per decoder or from approximately 256 Kbytes to 4 Mbytes per buffer for each of the eight video channels per decoder. The exact buffer size is somewhat less than these numbers because of the directory information and data controller microcode allocations described above. Also, the exact buffer size is a multiple of 44×512 bytes for the reasons discussed above regarding the mass storage file format. The RAM size is predetermined at the time the multimedia server is configured, based on the number of video channels in the server. RAM size varies in roughly a step-wise linear fashion from an 8 channel system to an 80 channel system, given that RAM is available in only gross increments of, for example, 4 Mbytes.

In a preferred embodiment, RAM is configured with one or two standard 72-pin SIMMs (Single In-line Memory Module) of dynamic RAM (DRAM). These SIMMs each hold a maximum 16 Mbytes organized as 4M×32 bits. The 32-bit SIMM data lines are buffered to the system data bus. The 11-bit SIMM address lines are multiplexed from 22-bits of the system address bus. The microcontroller firmware reads a four-bit ID from each SIMM, which indicates if the module is present in addition to its size. The firmware then calculates buffer size and allocates DRAM to each channel.

e. ROM

Referring again to FIG. 9, the decoder ROM (read-only-memory) 224 provides non-volatile storage for firmware, microcode and component configuration data. In a preferred embodiment, ROM is a Texas Instruments 27C040 or equivalent. The 27C040 is a 4 MBit UV Erasable, Programmable ROM (EPROM) organized as 512K ×8 bits. The 8 data bits of the EPROM are connected to the upper 8-bits of the 32-bit system data bus 202. This configuration is standard for the MC68349 microcontroller for 8-bit data transfers. The 19 address bits of the 27C040 are directly connected to the system address bus 202 and selected via one of the MC68349 programmable chip selects. In this manner, the ROM occupies the lowest 512K of address space, as shown in the memory map of FIG. 12, discussed below.

f. FIFO

Referring again to FIG. 9, the FIFO 212 buffers data from the RAM 210 into each of the multimedia processors 223 via the PLD 222. This acts as a second or adjunct buffer to the rate matching buffers of the RAM 210, discussed above. That is, the FIFO 212 allows short, fast bursts of data to be transferred from RAM 210 to the multimedia processors 214 which have a relatively slow data processing rate. This preserves the available bandwidth of the system bus 202 for transfers from the data controller 206 to RAM 210. Further, because the microcontroller 200 performs the transfer of data from RAM to the FIFO as programmed I/O, as described below, the FIFO 212 allows this transfer to proceed at a rate independent of the multimedia processor output data rate, reducing microcontroller processing latency and overhead. The FIFO 212 is logically configured as a 16-bit data portion and an associated address portion, as is discussed in more detail below. The address portion determines the particular multimedia processor 214 which receives the associated FIFO data. The FIFO 212 has a 16-bit data input 211 connected to the system bus 202. The FIFO 212, however, has an 8-bit data output 213 connected to the PLD 222. Thus, the data FIFO 212 performs a 16-bit to 8-bit data bus conversion, which also facilitates the fast and efficient transfer of data from RAM 210 to the multimedia processors 214.

g. PLD

Shown in FIG. 9, the PLD 222 controls data transfers from the microcontroller 200 to each of the multimedia processors 214. These transfers are either a direct mode transfer which occurs over a direct path 221 from the system bus 202 or an indirect mode transfer through the FIFO 212 as described above. The direct mode is utilized only upon decoder power-up to initialize the multimedia processors 214 as described below. The indirect mode is used during normal operation to transfer compressed multimedia data to the multimedia processors 214 or to re-initialize a multimedia processor 214 which has somehow malfunctioned.

The PLD 222 also provides much of the "glue logic" which generates control signals throughout the decoder. For example, the PLD 222 decodes the address portion of the system bus 202 which implements memory-mapped I/O used by the microcontroller 200 to read and write to the various devices listed in FIG. 12, discussed below. The PLD 222 also generates the required signals to refresh dynamic RAM 210 and arbitrate between system bus 202 access to RAM and refresh cycles. The PLD also provides system bus control signals for the data controller 206. These functions are discussed in more detail below.

h. Multimedia Processors

Figure 11:
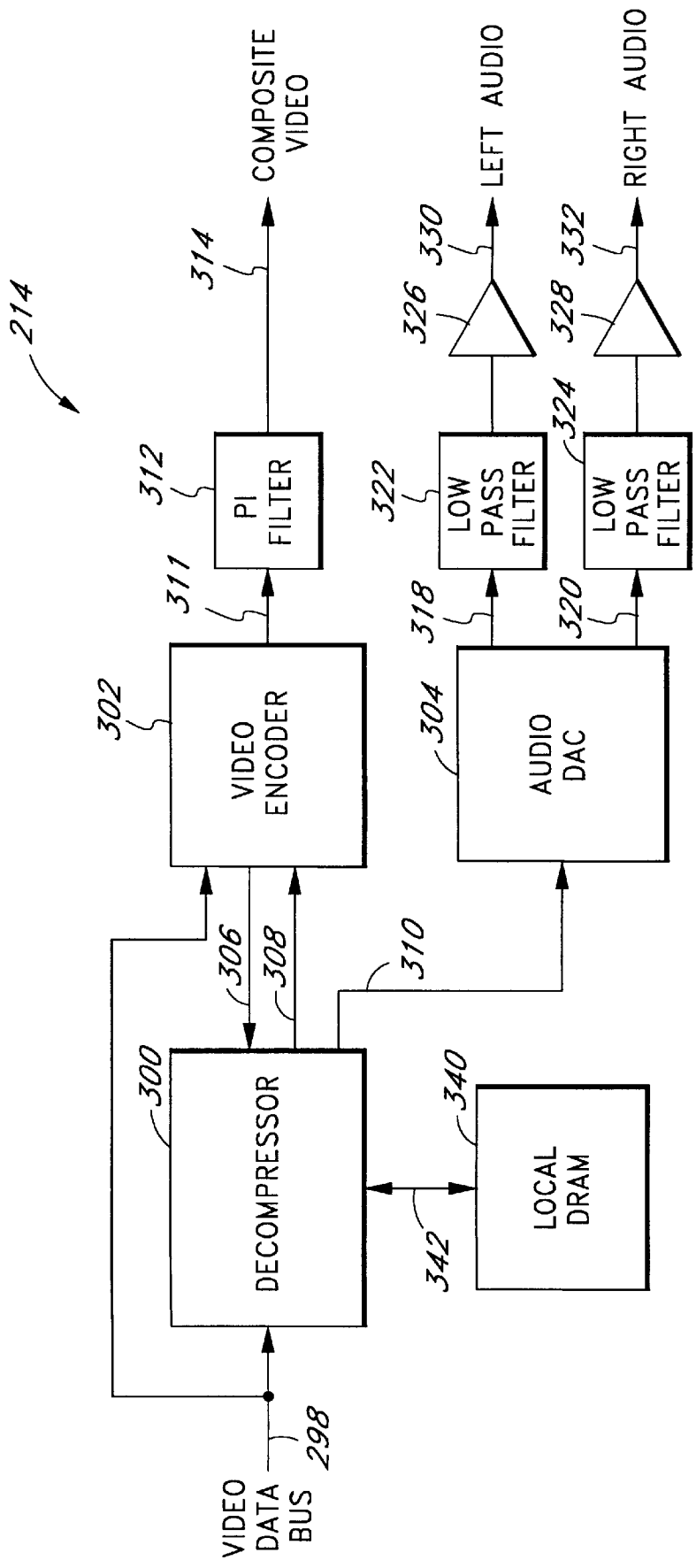
FIG. 11 is an block diagram of the multimedia processor portion of the decoder.

As shown in FIG. 11, each multimedia processor 214 has a decompressor 300, a video encoder 302, and an audio DAC (digital-to-analog converter) 304. The decompressor 300 reads compressed multimedia data over the video data bus 298, decompresses that data, and generates pixel data to the video encoder 302 and audio data to the audio DAC 304. The video encoder 302 reads the pixel data from the decompressor 300 over a pixel data bus 308 and generates an analog composite video output signal 311. The video encoder 302 also sends horizontal and vertical sync signals 306 to the decompressor 300. A pi filter 312 removes quantization noise from this composite video signal to produce a video output 314. The audio DAC 304 receives audio data from the decompressor 300 over an audio interface 310. The audio DAC 304 converts this audio data to an analog left audio signal 318 and an analog right audio signal 320. A left channel low-pass filter 322 and a right channel low-pass filter 324 remove quantization noise from these stereo audio signals, which are then amplified 326, 328 to generate a left audio output 330 and a right audio output 332. The decompressor 300 is interfaced 342 to a local memory 340 which stores compressed and processed multimedia data.

i. Decompressor

In a preferred embodiment, the decompressor 300 is a C-Cube Microsystems CL480 MPEG-1 audio/video decoder. The CL480 provides the address, data and control signals 342 to effect a glueless interface to local DRAM 340. In this embodiment, each CL480 is interfaced to an NEC Electronics, Inc. μPD424260, 256K ×16-bit Dynamic CMOS RAM. In addition to multimedia data, the CL480 utilizes this local DRAM 340 to store C-Cube Microsystems' proprietary microcode which is downloaded over the video data bus 298 during decoder power-up. This video data bus 298 of the CL480 300 has an 8-bit bidirectional data bus, a 3-bit address bus and control signals used to read and write data to the CL480's internal registers and its local DRAM as well as transfer compressed input multimedia data. The pixel data bus 308 transfers decompressed video output data in YUV (luminance-chrominance) format. The CL480's audio interface 310 includes a serial audio sample signal output, a channel identifier output, which identifies whether the audio sample output is the left or right stereo channel, an audio bit clock output, and an 11 MHz audio sample-rate clock.

ii. Video Encoder

In a preferred embodiment, the video encoder 302 is a Philips Semiconductors SAA7185 which is MPEG compatible and interfaces directly to the CL480 pixel data bus 308. The SAA7185 combines the functions of a luminance/chrominance encoder and a 10-bit video DAC. That is, the SAA7185 encodes the digital YUV outputs into luminance and color sub-carrier signals. It adds horizontal and vertical sync and blanking signals and generates an analog video signal 311 which is selectable to be either NTSC-M or PAL B/G standard compliant. The SAA7185 has an 8-bit input data port which is connected to the video data bus 298 for loading the SAA7185 internal registers and for device initialization. The SAA7185 also has an 8-bit MPEG video input port which is connected to the pixel data bus 308 over which the multiplexed YUV pixel data is transferred directly from the CL480 300.

iii. Audio DAC

In a preferred embodiment, the audio DAC 304 is a single Philips Semiconductors TDA1311AT, which processes both left and right stereo audio channels. The TDA1311AT accepts as its input 310 the bit-serial, time-multiplexed sampled audio output, channel identifier and bit clock signals from the CL480 decoder 300. Internally, the TDA1311AT has an input shift register for each channel which demultiplexes the data input signals 310 and converts the serial data stream into pairs of left and right 16-bit audio samples. Independent left and right channel DAC's in the TDA1311AT then create left 318 and right 320 analog audio outputs. The preferred low-pass filters 322, 324 are passive third-order RC circuits having a 20 db bandwidth of 50 KHz. The preferred audio amplifiers 326, 328 consist of a single Motorola MC33077 containing dual, low noise operational amplifiers, one for each channel to produce left 330 and right 332 channel 75Ω stereo audio outputs.

i. Clock Distribution

Timing for the decoder is derived from five independent oscillators. A 3.6864 MHz oscillator provides the baud rate clock for the microcontroller which is also used as a refresh clock by the PLD. A 25 MHz oscillator is used in conjunction with a Quality Semiconductor QS5917 Phase-Locked Loop (PLL) Clock Driver to derive low-skew clocks, two at 25 MHz for driving the microcontroller and data controller, and one at 50 MHz for driving the PLD and data controller. A 27 MHz oscillator is used with a Quality Semiconductor QS5805TQ clock driver buffer to derive eight, low-skew 27 MHz clocks, one each for the eight decompressors and video encoders. A 40 MHz oscillator is also buffered by a ½ of a QS5805TQ to create four signals to drive eight inputs of a QS3384Q CMOS bus switch with a regulated VCC at 3.9 V for voltage level shifting. This provides eight 40 MHz clocks for the decompressors. Finally, a 11.289 MHz oscillator buffered by ½ of a QS5805TQ provides four 11.289 MHz clocks, also used by the decompressors.

j. Memory Map

The microcontroller uses so-called memory-mapped I/O in which it communicates with various of the decoder components as if these components are memory. FIG. 12 illustrates the address space occupied by EPROM and RAM memory in addition to these addressable decoder components. The lowest 8 MBytes of address space is occupied by EPROM. The next to highest 32 MBytes of occupied address space is allocated to DRAM. The highest 16 Mbytes is reserved for the microcontroller's on-board memory. The memory area between EPROM and dynamic RAM addresses the PLD, causing it to decode the address bits A24–A25 and the lower seven address bits to perform specific functions. A24–A25=01 are decoded for either a FIFO write or a read of the decompressor CF Levels. A24–A25=10 are decoded for selecting the data controller. A24–25=11 select all other PLD functions. If the lower seven bits are 7–3F$_{16}$, the decompressors are selected. This occurs only at power-up initialization. If the lower seven bits are 40-4E$_{16}$, the video encoders are selected. Finally, if these bits are 70$_{16}$, the SIMM ID is read.

k. PLD Functions

Figure 13:
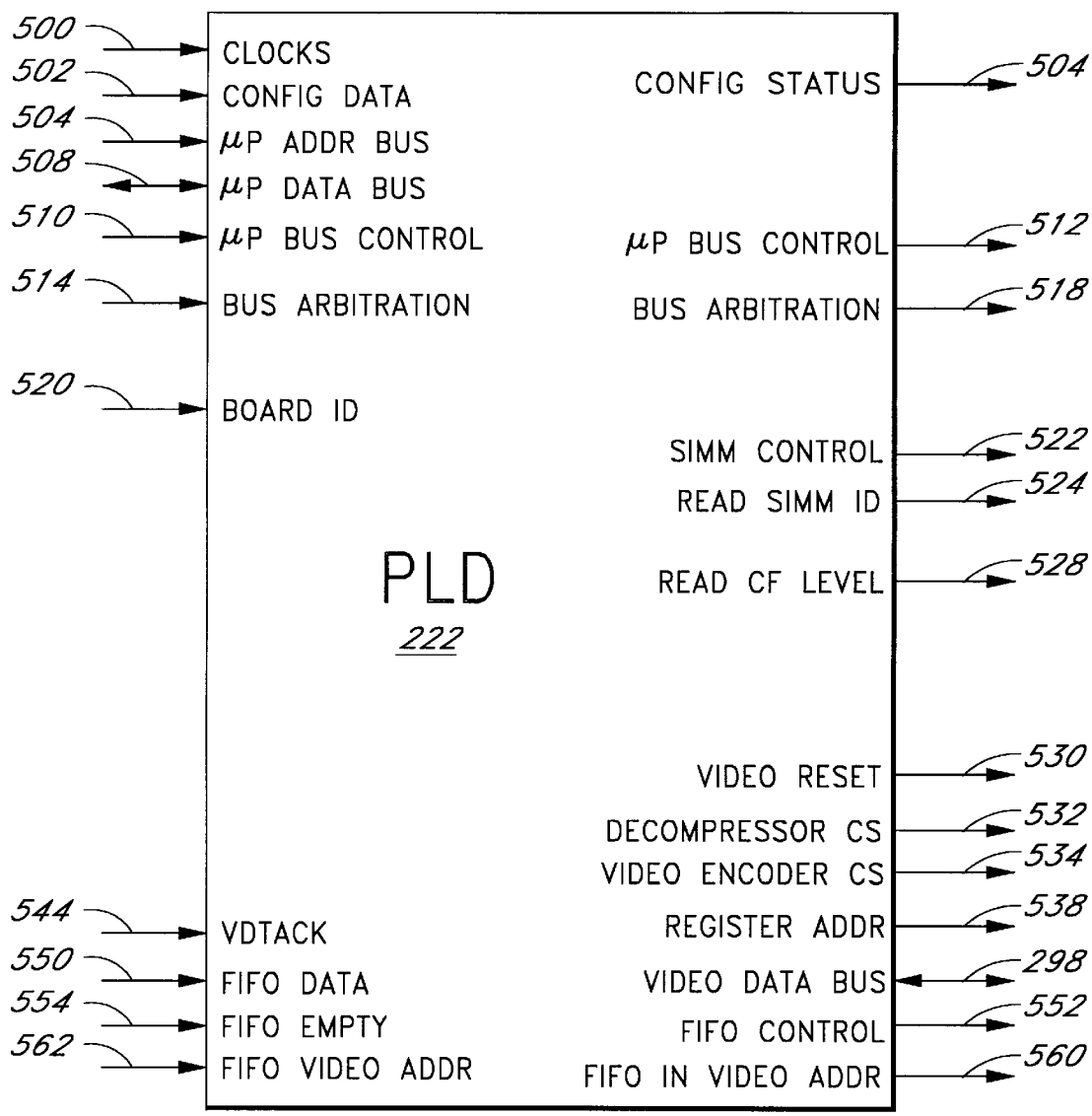
FIG. 13 is a detailed block diagram of the inputs and outputs of the PLD portion of the decoder.

FIG. 13 illustrates the PLD inputs and outputs. The PLD 222 has two clocks 500, a 50 MHz master clock and a 3.68 MHz clock used to time dynamic RAM refresh cycles. In addition, the PLD 222 has three configuration input 502 signals and two configuration output 504 signals used to dynamically configure the PLD upon decoder power-up. The configuration input 502 signals include a serial data line over which configuration data is downloaded, a data clock line which synchronizes the serial data, and a configuration input, which must be asserted for the PLD to accept configuration data. The configuration output 504 signals include a done signal, which is asserted when configuration is complete and a status line asserted if configuration was successful.

The PLD 222 also interfaces to the microcontroller system bus. The PLD has as inputs the system address bus 504, the bi-directional data bus 508 and bus control signals 510. The PLD also has output bus control signals 512. The address bus inputs 504 only include the least significant seven address bits, A0–A6 in addition to A24–A25. A24–A25 determine the global address for the PLD itself. That is, A24–A25 specify to the PLD that it needs to perform some function, perhaps relating to another device. A0–A6 specify particular devices and registers within the multimedia processors. Included with the control inputs 510 are microcontroller generated chip selects which indicate when an address on the address bus is valid. The other system bus control inputs 510 allow the PLD to interface to the microcontroller. This allows the PLD to respond to either the microcontroller or data controller when a system bus operation occurs. These signals include microprocessor read, data strobe and address strobe signals. These control inputs 510 also include function code bits which indicate, for example, when an interrupt cycle or an 8-bit, 16-bit, 32-bit transfer is occurring. The PLD also generates corresponding system bus control outputs 512 which include data strobe acknowledge signals.

Arbitration of the system bus between the microcontroller and the data controller is accomplished with two bus arbitration inputs 514 and one bus arbitration output 518. The inputs 514 include a microcontroller chip select and a bus control termination handshake signal from the data controller. The output 518 is a bus control acknowledge handshake signal to the data controller.

FIG. 13 also illustrates the implementation of decoder board addressing. Each decoder board has a SCSI address which is also an RS-232 address. The board ID 520 inputs are 4 bits from a rotary switch which yield an address in the range 0-$F_{16}$ which the PLD places on the data bus 508 in response to a microcontroller read of a specific memory address. This allows the microcontroller firmware to obtain the decoder board address and acknowledge this address in response to RS-232 commands or SCSI bus transfers.

The PLD 222 also generates SIMM control signals 522. These signals allow the PLD to refresh the dynamic RAM and arbitrate access to this RAM between the microcontroller, data controller and PLD refresh cycles. These signals include column and row address selects, write enables and a signal which controls the address multiplexing into the SIMMs, which occurs in two groups of 11-bits. A read SIMM ID 524 signal enables an buffer external to the PLD to place an ID byte on the system data bus 508 which the microcontroller can read to determine the amount of RAM, which is varied in a predetermined fashion as a function of video channels in a particular multimedia server configuration, as described above.

The decompressors can be individually or collectively reset. At decoder power-up, all decompressors are reset. If there is a malfunction of a particular decompressor which cause one video channel to fail, that particular decompressor can be reset without affecting the other decompressors. As shown in FIG. 13, this is accomplished with the video resets 530. There are four video reset signals. Three are decoded with an external 3-to-8 demultiplexer to create eight individual reset signals to the individual decompressors. The fourth signal controls an enable input on the demultiplexer, which resets all eight reset signals when asserted.

As shown in FIG. 13, data transfers to the decompressors and video encoders occur over the bi-directional video data bus 298. Data is transferred into a specific decompressor or video encoder through the use of eight decompressor chip selects 532 and eight video encoder chip selects 534, one for each of these devices. Transfers are completed by a VDTACK (video data acknowledge) 544 input signal. In addition, the decompressors and video encoders each have registers which can be read to or written from the video data bus 298. These registers are used to initialize, supply data, report status and control operation of these components. The PLD 222 has four register address outputs 538 which control these registers, including three bits of register address and a read/write bit.

As shown in FIG. 13 and described in more detail below, FIFO data 550 is routed through the PLD 222 to the video data bus 298. The PLD 222 has several inputs and outputs which control both the loading of data into the FIFO from RAM under the control of the microcontroller, and the unloading of the FIFO into the decompressors under the control of the PLD. FIFO control 552 outputs include a reset which clears the FIFO, a write signal which transfers data into the FIFO from the system data bus, and two read signals which transfer FIFO data to the PLD. A FIFO empty 554 input signal informs the PLD when the FIFO is empty. The PLD 222 also provides a 5-bit FIFO input video address bus 560 which feeds the address portion of the FIFO. The least-significant 3-bits of this video address signifies one of the eight decompressors. The most-significant 2-bits of this video address signifies one of four decompressor registers. The output of the address portion of the FIFO supplies these video addresses to the PLD 222 over the FIFO video address bus 562. A Read CF Level output 528 enables eight status lines, one from each decompressor, onto the data bus 508. Each of these status lines indicates when the corresponding decompressor is not ready to accept more data from the FIFO. The microcontroller determines this status by reading a specific memory address, which is decoded by the PLD before asserting Read CF level 528.

l. FIFO Transfers

Figure 14:
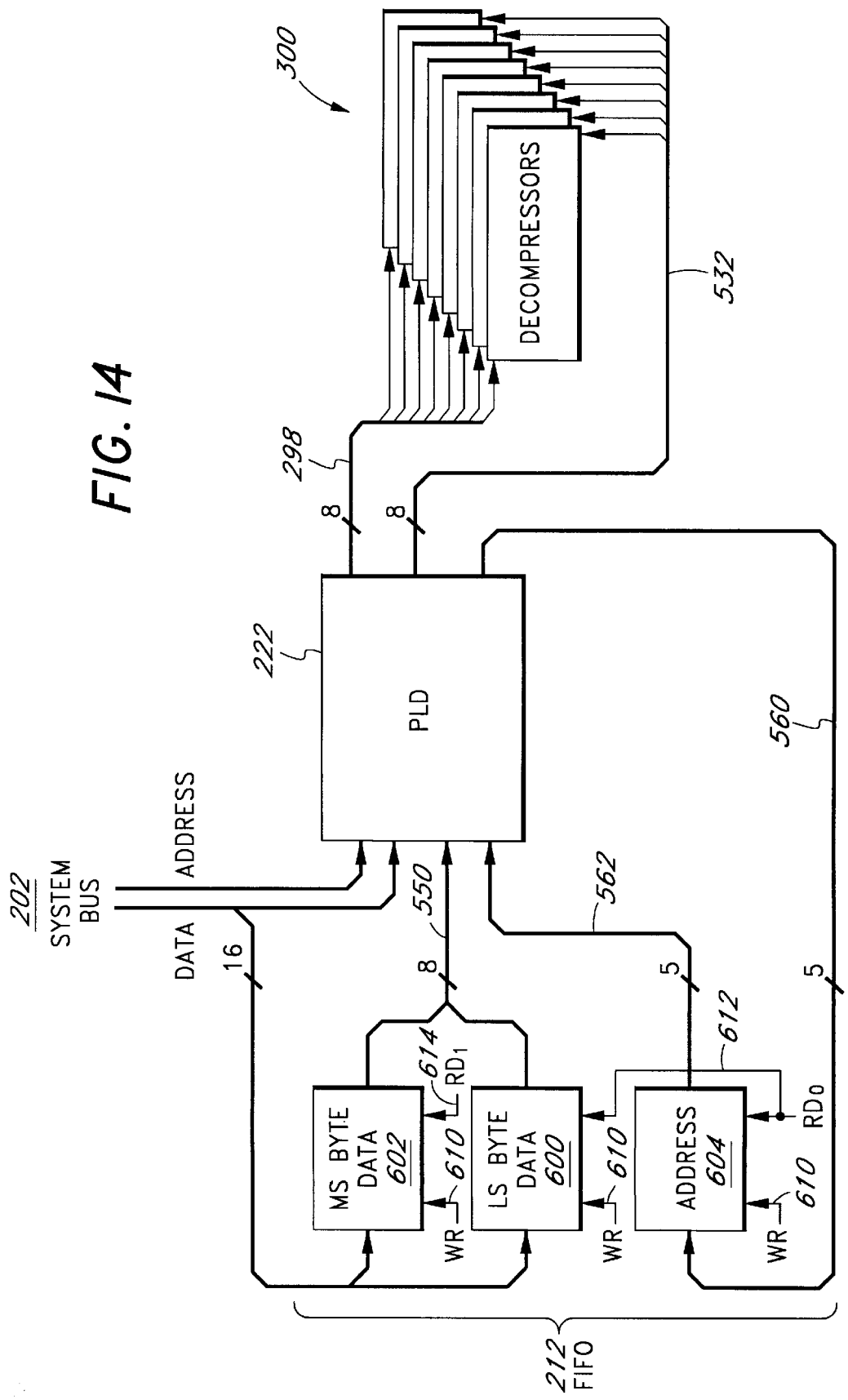
FIG. 14 is a detailed block diagram of the interconnected FIFO, PLD and decompressor portions of the decoder.

FIG. 14 illustrates the mechanism through which the PLD 222 controls the loading and unloading of the FIFO 212. The load and unload operations are independent, with the FIFO load occurring at the faster data rate of the microcontroller bus 202 and the FIFO unload occurring at the much slower processing rate of each decompressor 300. As shown in FIG. 14, the FIFO 212 is composed of a data portion 600, 602 and an address portion 604. The data portion has a least-significant byte data FIFO 600 and a most-significant byte data FIFO 602. The microcontroller loads the data FIFO 600, 602 by writing to the "FIFO Write" memory location shown in FIG. 12. The microcontroller also loads the FIFO address into the PLD by a write to the "FIFO address" memory location shown in FIG. 12. The PLD then generates a video address on the FIFO input video address bus 560. Next the PLD asserts FIFO write 610, which loads the data from the system bus 202 into the data FIFO 600, 602 and address from the FIFO input video address bus 560 into the address FIFO 604. Finally, the PLD asserts an acknowledgement to the microcontroller. Then FIFO empty is de-asserted.

When the PLD detects that the FIFO is no longer empty, it begins an unload sequence. The PLD 222 first asserts a read 612 for the least significant data byte 600 and the video address 604. The PLD also decodes the video address bus into 562 the corresponding decompressor register address and chip select 532, which is asserted. The PLD then waits to detect the video data acknowledge signal. Then the PLD asserts a read 614 for the most significant data byte 602. The register address is incremented by the PLD 222 and the chip select 532 is again asserted. The PLD 222 then waits once more for the video data acknowledge signal. This completes one FIFO unload cycle.

m. Microcontroller Firmware i. Power-Up

Figure 15:
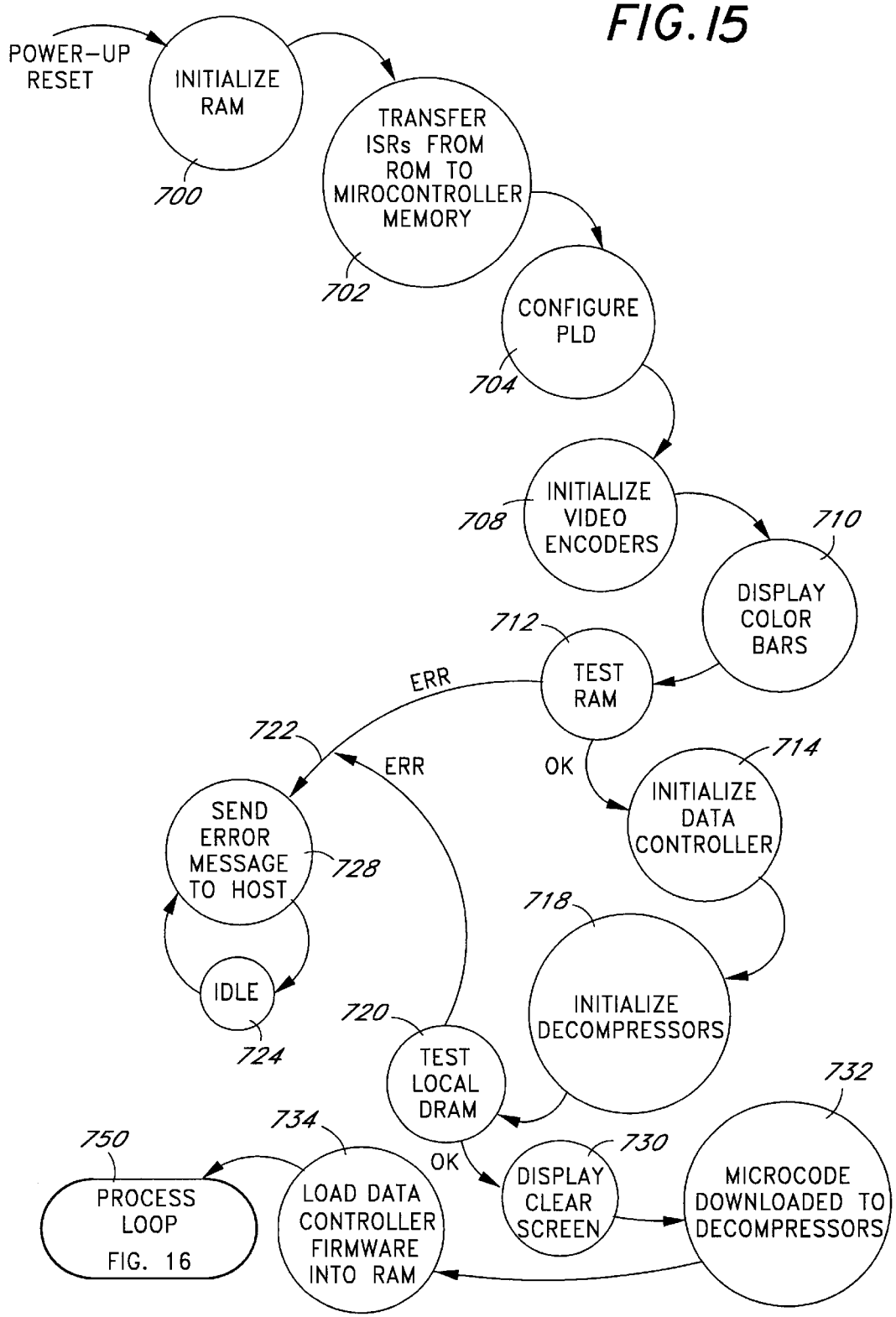
FIG. 15 is a flow diagram of the microcontroller power-up initialization routine.

The firmware performs the functions of power-up initialization and scheduling. On power-up, the microcontroller is reset and begins execution of the power-up routine shown in FIG. 15. The power-up routine first initializes RAM 700 and copies time-critical, interrupt service routines (ISR) from ROM to memory on-board the microcontroller 702. Next, configuration data is loaded into the PLD 704. Then, the video encoders are initialized 708 and configured to display color bars 710 at the video outputs. Next, a write/read test 712 is performed on RAM to insure proper functioning. The microcontroller then initializes the data controller 714. This is followed by initialization of the decompressors 718 and performance of a write/read test on decompressor-dedicated DRAMs 720. A fail mode is entered if any of the memory tests fail or any other error condition is detected 722. In fail mode, the decoder idles 724 and repeatedly sends an error message to the host 728. If the fail mode is not entered, the video encoders are set to display a clear (black) screen 730. Next, microcode is loaded into the decompressors 732. Finally, firmware for the data controller is loaded into RAM 734 and the microcontroller begins its process loop 750.

ii. Process Loop

Figure 16:
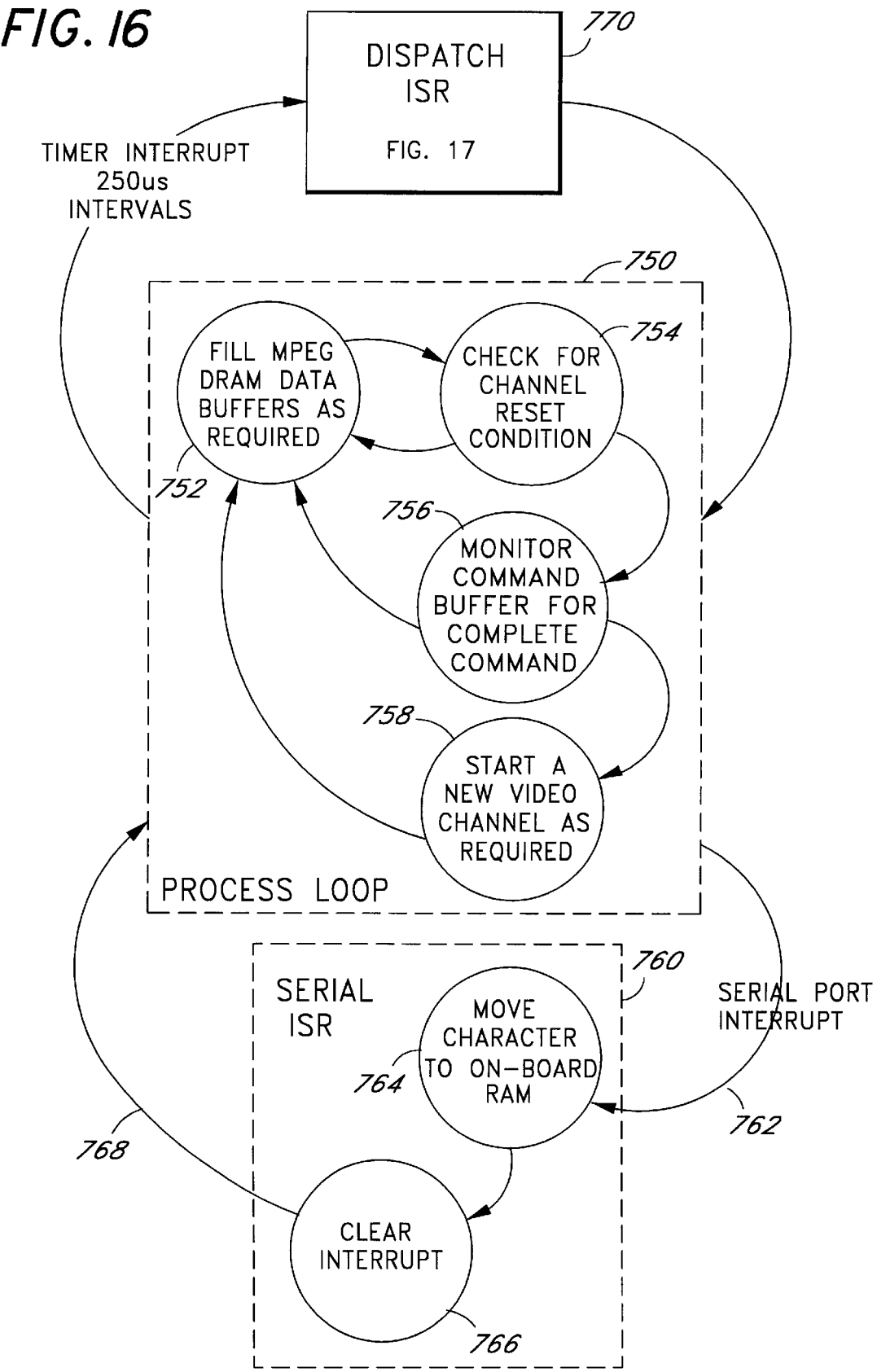
FIG. 16 is a flow diagram for the microcontroller firmware process loop.

The scheduling function of the microcontroller firmware is performed by a process loop 750 as shown in FIG. 16. The process loop follows a simple priority scheme which adheres to three general rules: once a video program starts, it must run continuously; if a video program fails, it must recover; and if time is available, a new video program can be started. To insure that a video program runs continuously, the process loop has a two-tier priority scheme. The higher tier is assigned to two ISRS, a higher-priority dispatch ISR 770 and a lower-priority serial port ISR 760. These are time critical routines that are loaded at power-up from ROM to memory on-board the microcontroller. The dispatch ISR 770 distributes data from the RAM buffer to the multimedia processors, as described below. The serial port ISR 760 is triggered when a hardware interrupt is generated by a received character at the serial port 762. This ISR simply transfers the received character into a command buffer in the microcontroller on-board RAM 764, clears the interrupt condition 768, and returns to the process loop 768.

The lower tier routines are not interrupt-driven but, rather, are scheduled according to priority by the process loop 750. The highest priority of these routines transfers data from mass storage through the data controller and into the RAM 752. This routine monitors the flags associated with the video channel buffers. When a buffer empty flag is detected, this routine initiates the data controller firmware which controls a data transfer from mass storage and a DMA transfer to RAM.

The next highest priority routine handles video program failures. An error processing routine 754 monitors the status of the multimedia processors. This routine monitors each multimedia processor. If a particular multimedia processor has not consumed data for an unusual period of time, the routine resets the decompressor of that video channel and downloads its microcode. In a preferred embodiment, this routine waits for a period of three video frame times before resetting the multimedia processor. Program data is then downloaded into the corresponding RAM buffers to continue the video program that was playing. The video program is initiated past the point where the multimedia processor failed on the theory that something in the previous data stream was potentially responsible for the failure of the decompressor. During the reset period, the video encoder will "hang," the video screen will go green, and the audio output will go silent. Typically, three seconds of programming will be disrupted during this process.

A lower priority routine is the command interpreter 756, which processes incoming command data. When a full command is assembled in the command buffer by the serial port ISR 760, this routine interprets the command and initiates the appropriate action, e.g. starting a new program. In a preferred embodiment, a line feed (LF) and carriage return (CR) are the delimiters for commands. This routine searches for a CR in the command buffer, indicating a complete command is assembled.

The lowest priority routine is that which begins a new data stream on a video channel 758. This routine is active, for example, after the appropriate PLAY command is received at the control port, as described above. This routine locates a free video channel, downloads the selected movie directory information to the ping-pong buffer associated with the free video channel, and sets the buffer empty flag so that the buffer fill routine 752 will download the requested compressed video program data.

iii. Dispatch ISR

As noted above, the dispatch ISR 770 has a higher priority than tasks in the process loop 750 or the serial port ISR 760. This interrupt is triggered at regular intervals 772 by an internal timer within the microcontroller. During each of these intervals, this ISR distributes data from the RAM buffer to the FIFO that feeds data to the multimedia processors of each video channel. The period between interrupts is chosen to be slightly smaller than the block size of the data transferred to a multimedia processor per interrupt divided by the data processing rate of a multimedia processor. In a preferred embodiment, the MPEG-1 standard requires an output data rate of 1.4 Mbits per second. In this embodiment, the internal FIFO of the CL480 decompressor can accept no more than 44 bytes of data in a burst without generating an indeterminate delay which would stall the video input data bus common to all of the CL480s of each video channel. This yields an interval of (44×8 bits)/(1.4 Mbits per second)=251.4 $\mu$sec. Thus, the internal timer of the MC68349 is set to generate a level 7 (highest priority) interrupt every 250 $\mu$sec.

Figure 17:
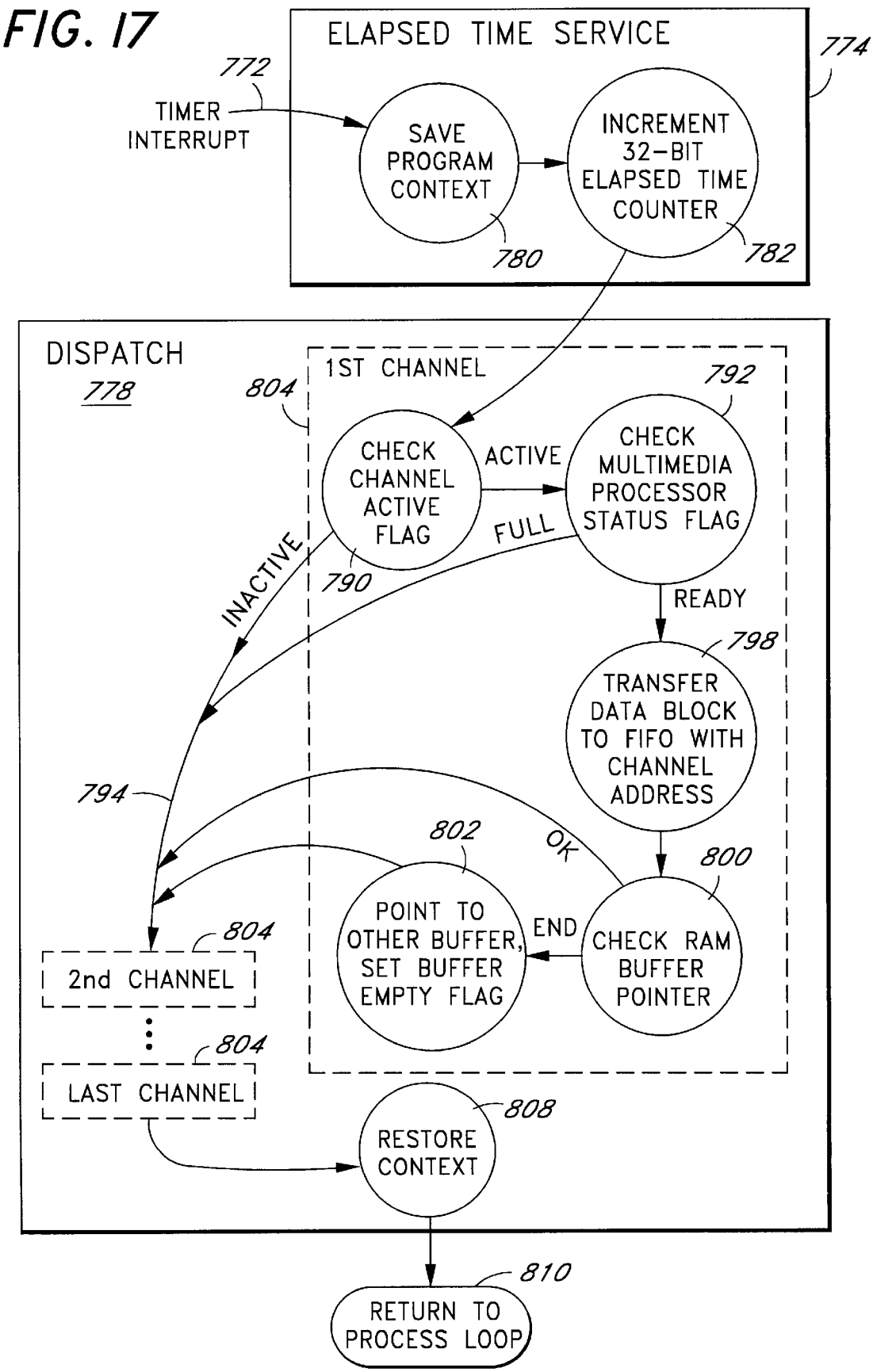
FIG. 17 is a flow diagram for the dispatch interrupt service routine.

As shown in FIG. 17, the dispatch ISR 770 begins with elapsed time service portion 774 which merely saves the program context 780 then increments a 32-bit counter 782. This counter can be read and cleared by the microcontroller in order to determine the elapsed time of any event, such as a bus timeout.

FIG. 17 also shows the dispatch portion 778 of the dispatch ISR 770. This begins by determining if a particular channel is active 790 by checking a software flag. The ISR also reads the status of a particular multimedia processor to determine if it can accept another data burst 792. If either of these conditions are not met, this particular channel is bypassed 794. Otherwise, the ISR transfers a block of data from RAM to the FIFO along with a pointer indicating this particular channel 798. The ISR checks if the RAM buffer for this channel is empty 800. If so, a buffer empty software flag is set and a pointer is initialized to the beginning of the alternate buffer for this channel 802. The above steps are then repeated for each video channel in the decoder 804. After all channels are processed, program context is restored 808 and the dispatch ISR returns 810 to the process loop 750.

In a preferred embodiment, there are eight video channels per decoder. Thus, the dispatch ISR 770 consists of eight essentially identical sections of code 804. In this embodiment, each section of code transfers 44 bytes of data from RAM to the FIFO every 250 $\mu$sec. Each section of code executes in approximately 25 $\mu$sec. Thus, the entire dispatch ISR 770 executes in approximately 200 $\mu$sec., leaving 50 $\mu$sec. for the microcontroller to execute all remaining tasks in the process loop 750 and serial ISR 760.

The multi-channel, multimedia data server has been disclosed in detail in connection with the preferred embodiments, but these embodiments are disclosed by way of examples only and are not to limit the scope of the present invention, which is defined by the claims that follow. One of ordinary skill in the art will appreciate many variations and modifications within the scope of this invention.

What is claimed:

1. A multimedia server for simultaneously and independently providing video-on-demand to a plurality of viewers comprising:
    a mass storage device for storing and retrieving multiple video programs formatted as compressed digital multimedia data files, said device having a maximum continuous data transfer rate for compressed digital video stored therein;
    a host for issuing commands which specify the initiation and performance of selected video programs stored on said mass storage device; and
    a decoder emulating a video tape deck comprising:
        a microcontroller providing a system bus and having a serial control port linked to said host for receiving a plurality of video tape deck commands from said host;
        a data controller interfaced to said system bus and having a data port linked to said mass storage device for the transfer of video programs as specified by said host from said mass storage device through said data controller and onto said system bus at a predetermined data output rate under the direction of said microcontroller;
        a memory buffer within said decoder for temporarily storing compressed video transferred from said mass storage device to said decoder so as to match said maximum continuous data transfer rate and said predetermined data output rate;
        said microcontroller metering data from said buffer in fixed-length data bursts occurring at fixed intervals such that the number of said video programs simultaneously playing may be substantially equal to said maximum continuous data transfer rate divided by said predetermined data output rate; and
        a plurality of processors each of which independently decompress video program data and encode said decompressed data into analog video and stereo audio outputs, said multimedia processors interfaced to said system bus so that said microcontroller can transfer video programs to any of said multimedia processors to create a corresponding plurality of video channels which can simultaneously and independently play one video program per video channel;
        said microcontroller executing a process loop which includes:
            an input task which controls the transfer of compressed video data from said data port to said memory buffer;
            a status task, lower in priority than said input task, which resets any particular one of said processors if an error condition exists;
            a command task, lower in priority than said status task, which monitors for a completed command received on said serial port;
            an initiation task, lower in priority than said command task, which starts a video program on one of said processors; and
            a dispatch task which interrupts said process loop at regular intervals, said dispatch task controlling the transfer of compressed video data from said memory buffer to said processors.

2. A multimedia server for simultaneously and independently providing video-on-demand to a plurality of viewers comprising:
    a mass storage device for storing and retrieving multiple video programs formatted as compressed digital multimedia data files, said device having a maximum continuous, data transfer rate for compressed digital video stored therein;
    a host for issuing commands which specify the initiation and performance of selected video programs stored on said mass storage device; and
    a decoder emulating a video tape deck comprising:
        a microcontroller providing a system bus and having a serial control port linked to said host for receiving a plurality of video tape deck commands from said host;
        a data controller interfaced to said system bus and having a data port linked to said mass storage device for the transfer of video programs as specified by said host from said mass storage device through said data controller and onto said system bus at a predetermined data output rate under the direction of said microcontroller;
        a memory buffer within said decoder for temporarily storing compressed video transferred from said mass storage device to said decoder so as to match said maximum continuous data transfer rate and said predetermined data output rate;
        said microcontroller metering data from said buffer in fixed-length data bursts occurring at fixed intervals such that the number of said video programs simultaneously playing may be substantially equal to said maximum continuous data transfer rate divided by said predetermined data output rate; and
        a plurality of processors each of which independently decompress video program data and encode said decompressed data into analog video and stereo audio outputs, said multimedia processors interfaced to said system bus so that said microcontroller can transfer video programs to any of said multimedia processors to create a corresponding plurality of video channels which can simultaneously and independently play one video program per video channel;
        said microcontroller executing a process loop which includes:
            an input task which controls the transfer of compressed video data from said data port to said memory buffer; and
            a status task, lower in priority than said input task, which resets any particular one of said processors if an error condition exists.

3. A multimedia server for simultaneously and independently providing video-on-demand to a plurality of viewers comprising:
    a mass storage device for storing and retrieving multiple video programs formatted as compressed digital multimedia data files, said device having a maximum continuous data transfer rate for compressed digital video stored therein;
    a host for issuing commands which specify the initiation and performance of selected video programs stored on said mass storage device; and
    a decoder emulating a video tape deck comprising:
        a microcontroller providing a system bus and having a serial control port linked to said host for receiving a plurality of video tape deck commands from said host;
        a data controller interfaced to said system bus and having a data port linked to said mass storage device for the transfer of video programs as specified by said host from said mass storage device through said data controller and onto said system bus at a predetermined data output rate under the direction of said microcontroller;

a memory buffer within said decoder for temporarily storing compressed video transferred from said mass storage device to said decoder so as to match said maximum continuous data transfer rate and said predetermined data output rate;

said microcontroller metering data from said buffer in fixed-length data bursts occurring at fixed intervals such that the number of said video programs simultaneously playing may be substantially equal to said maximum continuous data transfer rate divided by said predetermined data output rate; and a plurality of processors each of which independently decompress video program data and encode said decompressed data into analog video and stereo audio outputs, said multimedia processors interfaced to said system bus so that said microcontroller can transfer video programs to any of said multimedia processors to create a corresponding plurality of video channels which can simultaneously and independently play one video program per video channel;

said microcontroller executing a process loop which includes:
an input task which controls the transfer of compressed video data from said data port to said memory buffer;
a command task, lower in priority than said input task, which monitors for a completed command received on said serial port;
an initiation task, lower in priority than said command task, which starts a video program on one of said processors; and
a dispatch task which interrupts said process loop at regular intervals, said dispatch task controlling the transfer of compressed video data from said memory buffer to said processors.

4. A multimedia server for simultaneously and independently providing video-on-demand to a plurality of viewers comprising:

a mass storage device for storing and retrieving multiple video programs formatted as compressed digital multimedia data files, said device having a maximum continuous data transfer rate for compressed digital video stored therein;

a host for issuing commands which specify the initiation and performance of selected video programs stored on said mass storage device; and a decoder emulating a video tape deck comprising:
a microcontroller providing a system bus and having a serial control port linked to said host for receiving a plurality of video tape deck commands from said host;
a data controller interfaced to said system bus and having a data port linked to said mass storage device for the transfer of video programs as specified by said host from said mass storage device through said data controller and onto said system bus at a predetermined data output rate under the direction of said microcontroller;
a memory buffer within said decoder for temporarily storing compressed video transferred from said mass storage device to said decoder so as to match said maximum continuous data transfer rate and said predetermined data output rate;
said microcontroller metering data from said buffer in fixed-length data bursts occurring at fixed intervals such that the number of said video programs simultaneously playing may be substantially equal to said maximum continuous data transfer rate divided by said predetermined data output rate; and
a plurality of processors each of which independently decompress video program data and encode said decompressed data into analog video and stereo audio outputs, said multimedia processors interfaced to said system bus so that said microcontroller can transfer video programs to any of said multimedia processors to create a corresponding plurality of video channels which can simultaneously and independently play one video program per video channel;
said microcontroller executing a process loop which includes:
a dispatch task which interrupts said process loop at regular intervals, said dispatch task controlling the transfer of compressed video data from said memory buffer to said processors.

5. A multimedia server for simultaneously and independently providing video-on-demand to a plurality of viewers comprising:

a mass storage device for storing and retrieving multiple video programs formatted as compressed digital multimedia data files, said device having a maximum continuous data transfer rate for compressed digital video stored therein;

a host for issuing commands which specify the initiation and performance of selected video programs stored on said mass storage device; and a decoder emulating a video tape deck comprising:
a microcontroller providing a system bus and having a serial control port linked to said host for receiving a plurality of video tape deck commands from said host;
a data controller interfaced to said system bus and having a data port linked to said mass storage device for the transfer of video programs as specified by said host from said mass storage device through said data controller and onto said system bus at a predetermined data output rate under the direction of said microcontroller;
a memory buffer within said decoder for temporarily storing compressed video transferred from said mass storage device to said decoder so as to match said maximum continuous data transfer rate and said predetermined data output rate;
said microcontroller metering data from said buffer in fixed-length data bursts occurring at fixed intervals such that the number of said video programs simultaneously playing may be substantially equal to said maximum continuous data transfer rate divided by said predetermined data output rate; and
a plurality of processors each of which independently decompress video program data and encode said decompressed data into analog video and stereo audio outputs, said multimedia processors interfaced to said system bus so that said microcontroller can transfer video programs to any of said multimedia processors to create a corresponding plurality of video channels which can simultaneously and independently play one video program per video channel.

* * * * *